US012753849B2

(12) United States Patent
Sturm et al.

(10) Patent No.: US 12,753,849 B2
(45) Date of Patent: Oct. 6, 2026

(54) ELECTRICALLY ACTUATED VALVES

(71) Applicant: SCHUKRA BERNDORF GMBH, Berndorf (AT)

(72) Inventors: Sigurd Sturm, Nuremberg (DE); Gerhard Hoerber, Nuremberg (DE); Daniel Schmitz, Altdorf (DE)

(73) Assignee: SCHUKRA BERNDORF GMBH, Berndorf (AT)

( * ) Notice: Subject to any disclaimer, the term of this patent is extended or adjusted under 35 U.S.C. 154(b) by 0 days.

(21) Appl. No.: 18/828,958

(22) Filed: Sep. 9, 2024

(65) Prior Publication Data

US 2024/0426390 A1 Dec. 26, 2024

Related U.S. Application Data

(63) Continuation of application No. 17/904,852, filed as application No. PCT/EP2021/052391 on Feb. 2, 2021, now Pat. No. 12,085,185.

(30) Foreign Application Priority Data

Feb. 24, 2020 (EP) .................................... 20159119

(51) Int. Cl.
*F16K 27/00* (2006.01)
*F03G 7/06* (2006.01)
(Continued)

(52) U.S. Cl.
CPC ........ *F16K 27/003* (2013.01); *F03G 7/06143* (2021.08); *F03G 7/064* (2021.08);
(Continued)

(58) Field of Classification Search
CPC ...... F16K 27/003; F16K 31/02; F16K 31/025; F03G 7/06143; F03G 7/064; B60N 2/665; B60N 2/914
(Continued)

(56) References Cited

U.S. PATENT DOCUMENTS 3,203,447 A 8/1965 Bremner et al.
3,442,483 A 5/1969 Schwartz
(Continued)

FOREIGN PATENT DOCUMENTS

CA 2435356 A1 1/2001
CN 1277661 A 12/2000
(Continued)

OTHER PUBLICATIONS

G.Rau Innovative Metalle, "Thermal Actuators", 12 pages, retrieved Apr. 7, 2019.
(Continued)

*Primary Examiner* — Minh Q Le
(74) *Attorney, Agent, or Firm* — MICHAEL BEST & FRIEDRICH LLP

(57) ABSTRACT

A valve includes a housing with a bottom plate, first and second fluid ports, and an actuator component arranged such that the bottom plate engages the actuator component. The actuator component includes a carrier, a plunger arranged on the carrier and comprising a sealing surface, a shape memory alloy actuator arranged co-linearly with the plunger between the carrier and the plunger to exert an actuation force onto the plunger, and a spring co-linearly arranged with the plunger between the carrier and the plunger to exert a bias force onto the plunger. The sealing surface of the plunger can sealingly engage the first fluid port. The valve further includes a circuit board comprising circuitry to actuate the shape memory alloy actuator. The housing is at least partly arranged between the circuit board and carrier and comprises through holes to receive electrical pins of the actuator component extending towards the circuit board.

20 Claims, 18 Drawing Sheets

(51) Int. Cl.

| | |
|---|---|
| ***F16K 31/02*** | (2006.01) |
| *B60N 2/66* | (2006.01) |
| *B60N 2/90* | (2018.01) |

(52) U.S. Cl.
CPC .............. *F16K 31/02* (2013.01); *B60N 2/665* (2015.04); *B60N 2/914* (2018.02); *F16K 31/025* (2013.01)

(58) Field of Classification Search
USPC .......................................................... 251/366
See application file for complete search history.

(56) References Cited

U.S. PATENT DOCUMENTS

| | | | | |
|---|---|---|---|---|
| 4,522,219 | A | 6/1985 | Ohkata | |
| 4,529,214 | A | 7/1985 | Stoll et al. | |
| 4,548,041 | A | 10/1985 | Taylor | |
| 4,630,799 | A | 12/1986 | Nolan et al. | |
| 4,674,398 | A | 6/1987 | Taylor | |
| 4,736,587 | A | 4/1988 | Suzuki | |
| 4,903,732 | A | 2/1990 | Allen | |
| 4,922,965 | A | 5/1990 | Meister | |
| 4,973,024 | A | 11/1990 | Homma | |
| 5,092,360 | A | 3/1992 | Watanabe et al. | |
| 5,148,833 | A | 9/1992 | Ota | |
| 5,211,371 | A | 5/1993 | Coffee | |
| 5,904,712 | A | 5/1999 | Axelgaard | |
| 6,098,000 | A | 8/2000 | Long et al. | |
| 6,203,105 | B1 | 3/2001 | Rhodes, Jr. | |
| 6,253,736 | B1 | 7/2001 | Crofts et al. | |
| 6,311,950 | B1 | 11/2001 | Kappel et al. | |
| 6,467,460 | B1 | 10/2002 | Stier | |
| 6,499,509 | B2 | 12/2002 | Berger et al. | |
| 6,502,803 | B1 | 1/2003 | Mattes | |
| 7,744,059 | B2 | 6/2010 | Jerg | |
| 7,815,161 | B2 | 10/2010 | Saitoh et al. | |
| 7,886,993 | B2 | 2/2011 | Bachmaier et al. | |
| 8,499,779 | B2 | 8/2013 | Gillespie | |
| 8,616,237 | B2 * | 12/2013 | Jansen | F15B 13/0442 137/613 |
| 8,629,745 | B2 | 1/2014 | Sturman et al. | |
| 8,784,080 | B2 | 7/2014 | Dorfler et al. | |
| 8,794,707 | B2 | 8/2014 | Bocsanyi et al. | |
| 9,080,581 | B2 | 7/2015 | Bocsanyi et al. | |
| 9,186,853 | B2 | 11/2015 | Khan et al. | |
| 9,797,521 | B1 | 10/2017 | Davis | |
| 9,856,842 | B2 | 1/2018 | Wuerfel et al. | |
| 9,945,490 | B2 | 4/2018 | Dankbaar et al. | |
| 9,951,765 | B2 | 4/2018 | Ki et al. | |
| 10,066,756 | B2 | 9/2018 | Sohn | |
| 10,107,279 | B2 | 10/2018 | Dankbaar et al. | |
| 10,107,410 | B2 | 10/2018 | Dankbaar et al. | |
| 10,207,619 | B2 | 2/2019 | Dankbaar et al. | |
| 10,290,876 | B2 | 5/2019 | Prieto et al. | |
| 10,378,677 | B2 | 8/2019 | Kuszneruk et al. | |
| 10,753,494 | B2 | 8/2020 | Beuschel et al. | |
| 10,948,097 | B2 | 3/2021 | Dorfler et al. | |
| 11,073,219 | B2 | 7/2021 | Dorfler et al. | |
| 11,730,308 | B2 * | 8/2023 | Butera | A47J 31/3614 99/289 R |
| 2002/0112788 | A1 | 8/2002 | Tanaka et al. | |
| 2003/0178074 | A1 | 9/2003 | Itzhaky | |
| 2003/0183289 | A1 | 10/2003 | Seuret et al. | |
| 2004/0104368 | A1 | 6/2004 | Weber | |
| 2005/0005980 | A1 | 1/2005 | Eberhardt et al. | |
| 2005/0024174 | A1 | 2/2005 | Kolb et al. | |
| 2005/0139610 | A1 | 6/2005 | Crossdale et al. | |
| 2005/0139796 | A1 | 6/2005 | Altonji | |
| 2005/0263196 | A1 | 12/2005 | Hsieh | |
| 2007/0023089 | A1 | 2/2007 | Beyerlein et al. | |
| 2007/0113906 | A1 | 5/2007 | Sturman et al. | |
| 2008/0034749 | A1 * | 2/2008 | Ukpai | F03G 7/0641 60/527 |
| 2008/0271559 | A1 | 11/2008 | Garscha et al. | |
| 2009/0302708 | A1 * | 12/2009 | Takahashi | F03G 7/06143 310/306 |
| 2010/0139785 | A1 | 6/2010 | Saitoh et al. | |
| 2010/0230622 | A1 | 9/2010 | Boecking | |
| 2011/0095216 | A1 | 4/2011 | Degreef et al. | |
| 2012/0067430 | A1 | 3/2012 | Deperraz et al. | |
| 2012/0143108 | A1 | 6/2012 | Bocsanyi et al. | |
| 2012/0153043 | A1 | 6/2012 | Arekar et al. | |
| 2012/0199763 | A1 | 8/2012 | Lind | |
| 2012/0199768 | A1 | 8/2012 | Love et al. | |
| 2014/0103232 | A1 | 4/2014 | Deperraz | |
| 2014/0191549 | A1 | 7/2014 | Hermansson | |
| 2014/0232155 | A1 | 8/2014 | Bocsanyi et al. | |
| 2015/0028234 | A1 | 1/2015 | Kraus et al. | |
| 2015/0141887 | A1 | 5/2015 | Kawashima et al. | |
| 2016/0018016 | A1 | 1/2016 | Dankbaar et al. | |
| 2016/0061344 | A1 | 3/2016 | Jackson, Jr. et al. | |
| 2016/0153575 | A1 | 6/2016 | Sohn | |
| 2016/0207075 | A1 | 7/2016 | Alexander et al. | |
| 2017/0025784 | A1 | 1/2017 | Greene | |
| 2017/0097104 | A1 | 4/2017 | Deperraz | |
| 2018/0023906 | A1 | 1/2018 | Tajiri et al. | |
| 2018/0038514 | A1 | 2/2018 | Kusneruk et al. | |
| 2018/0283571 | A1 | 10/2018 | Miyazoe et al. | |
| 2018/0306212 | A1 | 10/2018 | Weickel et al. | |
| 2018/0363642 | A1 | 12/2018 | Salih et al. | |
| 2019/0003609 | A1 | 1/2019 | Asai et al. | |
| 2019/0049026 | A1 | 2/2019 | Beuschel et al. | |
| 2019/0049033 | A1 | 2/2019 | Mitzler et al. | |
| 2019/0107214 | A1 | 4/2019 | Kruppe et al. | |
| 2019/0116681 | A1 | 4/2019 | De Carolis et al. | |
| 2019/0118690 | A1 | 4/2019 | Beuschel et al. | |
| 2019/0120402 | A1 | 4/2019 | Jamison et al. | |
| 2019/0195246 | A1 | 6/2019 | Jamison et al. | |
| 2019/0353268 | A1 | 11/2019 | Dorfler et al. | |
| 2019/0353270 | A1 | 11/2019 | Dorfler et al. | |
| 2020/0088314 | A1 | 3/2020 | Samain et al. | |
| 2020/0103047 | A1 | 4/2020 | Beuschel et al. | |
| 2020/0287322 | A1 | 9/2020 | Dörfler et al. | |
| 2020/0347833 | A1 | 11/2020 | Dankbaar et al. | |
| 2020/0378516 | A1 | 12/2020 | Beuschel et al. | |
| 2021/0018109 | A1 | 1/2021 | Beuschel et al. | |
| 2022/0205551 | A1 | 6/2022 | Nicola et al. | |
| 2022/0243827 | A1 | 8/2022 | Nicola et al. | |
| 2023/0023113 | A1 | 1/2023 | Ornot | |
| 2023/0125583 | A1 * | 4/2023 | Pagel | F16K 31/025 137/625.48 |
| 2023/0183953 | A1 | 6/2023 | Torres et al. | |

FOREIGN PATENT DOCUMENTS

| | | | |
|---|---|---|---|
| CN | 2526615 | Y | 12/2002 |
| CN | 101095000 | A | 12/2007 |
| CN | 103620284 | A | 3/2014 |
| CN | 103991396 | A | 8/2014 |
| CN | 105026207 | A | 11/2015 |
| CN | 105465090 | A | 4/2016 |
| CN | 107701731 | A | 2/2018 |
| CN | 108953683 | A | 12/2018 |
| CN | 109318770 | A | 2/2019 |
| DE | 19545011 | A1 | 4/1997 |
| DE | 19718169 | A1 | 11/1998 |
| DE | 10063478 | A1 | 7/2002 |
| DE | 102005060217 | A1 | 7/2006 |
| DE | 102006053147 | A1 | 5/2007 |
| DE | 102011100327 | B3 | 8/2012 |
| DE | 102013208820 | A1 | 11/2014 |
| DE | 202014006875 | U1 | 12/2014 |
| DE | 102015201534 | B3 | 4/2016 |
| DE | 102014225756 | A1 | 6/2016 |
| DE | 102016225519 | A1 | 6/2018 |
| DE | 102017204662 | B3 | 7/2018 |
| DE | 102017107073 | A1 | 10/2018 |
| DE | 102017217213 | B3 | 3/2019 |
| DE | 102018200635 | A1 | 7/2019 |
| EP | 0423045 | A1 | 4/1991 |
| EP | 1619287 | A1 | 1/2006 |
| EP | 1909008 | A1 | 4/2008 |
| EP | 1988440 | A1 | 11/2008 |

(56) References Cited

FOREIGN PATENT DOCUMENTS

| | | | |
|---|---|---|---|
| EP | 2078891 | A2 | 7/2009 |
| EP | 2740521 | A1 | 6/2014 |
| EP | 2860401 | A2 | 4/2015 |
| EP | 3343078 | A1 | 7/2018 |
| GB | 830393 | A | 3/1960 |
| GB | 830394 | A | 3/1960 |
| GB | 971816 | A | 10/1964 |
| JP | 4091035 | B2 | 5/2008 |
| WO | 2004104462 | A1 | 12/2004 |
| WO | 2012159689 | A1 | 11/2012 |
| WO | 2014135909 | A1 | 9/2014 |
| WO | 2015185132 | A | 12/2015 |
| WO | 2018005528 | A1 | 1/2018 |
| WO | 2018049526 | A1 | 3/2018 |
| WO | 2018065217 | A1 | 4/2018 |
| WO | 2019149498 | A1 | 8/2019 |
| WO | 2019/218072 | A1 | 11/2019 |

OTHER PUBLICATIONS

International Search Report and Written Opinion for Application No. PCT/EP2021/052391 dated Jun. 28, 2021 (20 pages).

International Preliminary Report on Patentability for Application No. PCT/EP2021/052391 dated Aug. 30, 2022 (12 pages).

Chinese Patent Office Action for Application No. 202180014760.6 dated Mar. 22, 2025 (20 pages including English translation).

* cited by examiner

SMA Gen2 Module – 3D View – Bottom Side
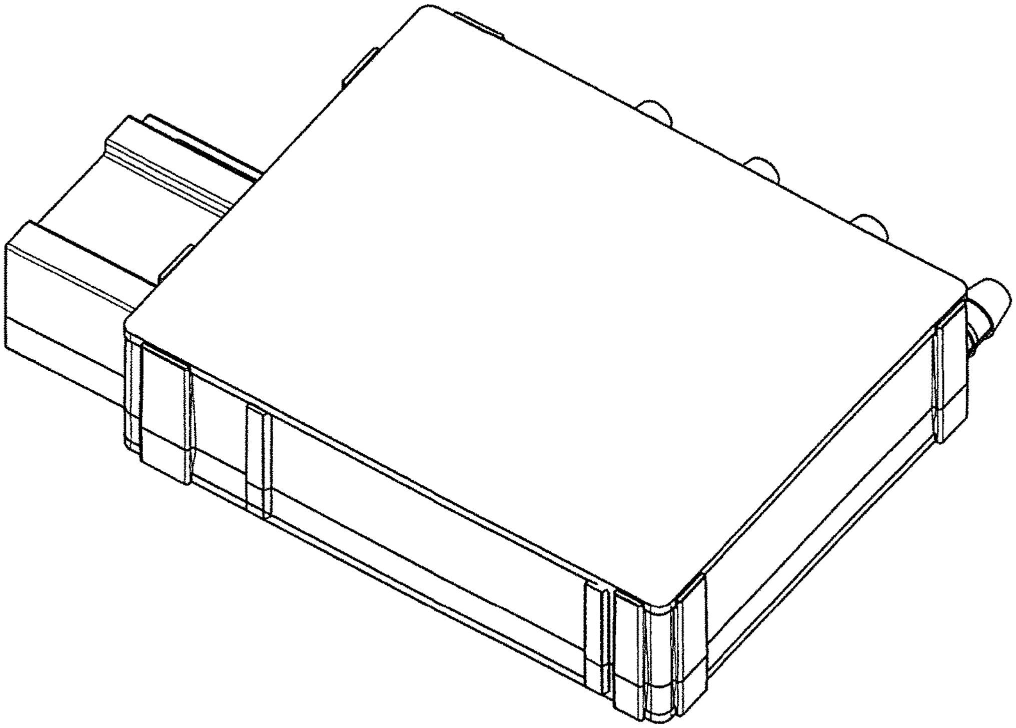
FIG. 24
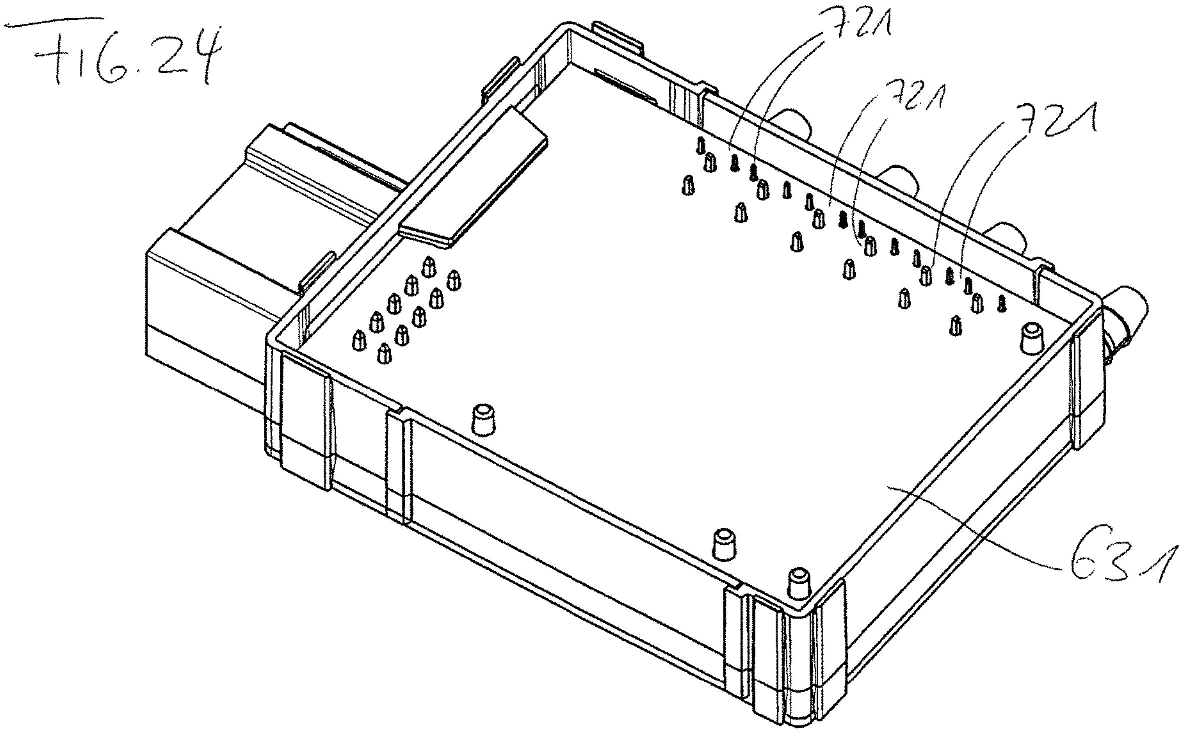

ELECTRICALLY ACTUATED VALVES

TECHNICAL FIELD

Various techniques generally relate to electric actuation of a fluid valve. Various techniques specifically relate to actuation of a valve using a shape memory alloy actuator. Various techniques relate to a modular assembly of a valve using an actuation component that is attachable to a housing, to thereby form the valve. Various techniques relate to a modular assembly of a system including multiple valve blocks, wherein each valve block includes one or more valves.

BACKGROUND

Valves to switch a fluid flow are employed in various fields including automotive seating. Here, an example application includes switching the flow of pressurized air to implement functions such as lumbar support, bolster adjustment, and massage.

Traditionally, such valves are implemented using solenoid technology. However, respective valves are comparably bulky and heavy and, furthermore, cause a significant noise level during operation.

To overcome these issues, valves are sometimes equipped with an actuator employing a shape memory alloy (SMA) wire.

For example, reference implementations of valves employing an SMA wire can be comparably complex and require many parts. Further, the respective valves can use housings having large dimensions such that they are difficult to integrate. Often, the valves can be difficult to assemble.

SUMMARY

Therefore, a need exists for advanced techniques of actuating valves employing a SMA wire. A need exists for techniques that facilitate simple and efficient switching of fluid flows. A need exists for such techniques which overcome or mitigate at least some of the above-identified restrictions and drawbacks.

This need is met by the features of the independent claims. The features of the dependent claims define embodiments.

According to various aspects, a modular setup of valves and systems of valves is provided.

A first level of modularity is provided by an actuator component that provides for the various parts that move to open and close a fluid flow path. A housing includes one or more fluid ports that define the fluid flow path. The actuator component can be assembled outside of the housing and can then, subsequent to assembly, be attached to the housing, thereby forming a valve. The actuator component is thus configured to cooperate with the housing to form the valve.

A actuator component includes a carrier. The carrier is attachable to the housing. The actuator component also includes a plunger. The plunger is arranged on the carrier. The plunger includes a sealing surface that is arranged at a top end of the plunger.

The sealing surface can thus-depending on a position of the plunger-selectively engage with a circumference of a fluid port that is formed in the housing, to thereby cut off the fluid flow path. Thus, the fluid flow can be switched and the valve is formed. Also, the actuator component may include an elastic member that is arranged between the carrier and the plunger and is configured to exert a bias force onto the plunger. This can help to implement a normally-off or normally-on valve, by biasing the plunger into an opened or a closed position.

To actuate the plunger—i.e., to move the plunger between the opened position and the closed position—an electrical actuator is provided, mounted to the carrier. As a general rule, different kinds of types of electrical actuators can be used in the techniques described herein. Examples include solenoid actuators using electromagnetic flux to move the plunger or piezoelectric actuators using the piezoelectric effect to move the plunger.

In some examples, the actuator component includes an SMA wire implementing the actuator. The SMA wire is arranged between the carrier and the plunger and is configured to exert an actuation force onto the plunger.

It is possible that the SMA wire and the plunger are co-linearly arranged.

The elastic member can be implemented by a spring, e.g., a compression spring. It is possible that the spring is co-linearly arranged with the SMA wire and the plunger.

The actuator component together with the housing forms a valve. Each valve can include one or more actuator components. The housing—e.g., together with a top plate that sealingly engages side parts of the housing—can define a respective fluid-flow compartment for each valve. For example, 2-way valves or 3-way valves can be defined and a respective count of fluid ports can be provided in the respective fluid-flow compartment.

A second level of modularity is proved by using a common housing for multiple valves, e.g., multiple 2-way and/or 3-way valves. This system of valves can be labelled valve block. It is possible that the actuator components of a valve block are contacted by a single circuit board, to provide an electrical current that activates or deactivates the SMA wire.

A third level of modularity is provided by using multiple valve blocks. The multiple valve blocks can be connected by respective connection components. A fluid flow path can extend between the multiple valve blocks and through the connection components. A single circuit board can be shared between the actuator components of the multiple valve blocks.

A system includes multiple valve blocks attached to a circuit board. Each valve block includes a respective housing and one or more valves arranged in the respective housing. The housings of the multiple valve blocks are fluidly connected via connection components. Each connection component includes an elastic element. The elastic elements are configured to provide a positional degree of freedom for relative displacement of the respective to valve blocks with respect to each other.

Such arrangement helps to electrically connect the actuators of the valves of the valves block to the circuit board. The valves can include electrical pins that are coupled to the circuit board. In particular, relative arrangement of respective electrical pins with respect to contact elements of the circuit board can be facilitated by the positional degree of freedom provided by the elastic element.

For example, it would be possible to firstly assemble the actuator components (first level of modularity), secondly attach the actuator components to the housing of a valve block (and possibly repeat this for multiple valve blocks), and thirdly connect the multiple valve blocks with each other via respective connection components.

Such techniques can be applied for various kinds and types of actuators, e.g., SMA wires, solenoids, or piezoelectric actuators.

A method includes assembling one or more actuator components of a valve block. Each one of the one or more actuator components includes a plunger and an actuator. The method also includes attaching the one or more actuator components to a housing of the valve block. This is after said assembling of the one or more actuator components of the valve block. The housing includes, for each one of the one or more actuator components, at least one respective fluid port.

The actuator components may include a carrier on which the plunger and the actuator are mounted.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 24 is a further perspective view of the system of FIG. 23.

DETAILED DESCRIPTION OF EMBODIMENTS

Figure 1:
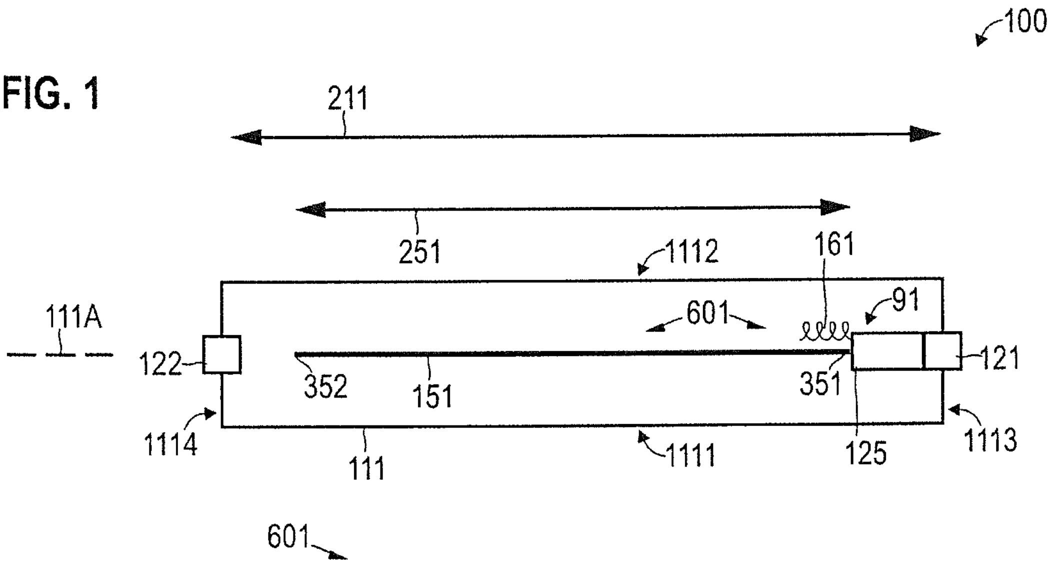
FIG. 1 schematically illustrates a valve according to various examples, wherein the valve is operated in a closed position.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of switching a fluid flow are described. The fluid may be a gas or a liquid. To switch the fluid flow, a valve is employed. The valve includes a fluid port and a plunger. The plunger (sometimes also referred to as piston) is configured to selectively seal the fluid port. The plunger includes a sealing surface for this purpose. For example, the plunger may fully seal the fluid port in a closed position and fully unseal the fluid port in an opened position. In other examples, also an intermediate position is conceivable where the plunger partially seals the fluid port, i.e., provides a certain flow resistance to the fluid.

To displace the plunger, an electric actuator is employed. The actuator displaces the plunger between the opened position and the closed position. The plunger moves between the closed position and the opened position along a displacement direction. Example electric actuators include, but are note limited to: SMA actuators, piezoelectric actuators, or solenoid actuators.

The valves described herein may find application in various fields. For example, the valves may be employed in seats, e.g., office chairs or automotive seats. Here, bladders in the seats may be selectively filled with pressurized air. This increases the seating comfort. Massage functionality may be possible.

For example, a control unit may be provided which is configured to control the actuation of the valve. The control unit may be implemented by a microcontroller, a field-programmable array (FPGA), or an application-specific integrated circuit (ASIC). The control unit can output and/or detect electric current or electric currents, to thereby control operation of a valve actuator.

According to examples, the actuator is implemented by an SMA wire. For example, the SMA wire may be implemented by a wire-shaped SMA material or by a belt-shaped SMA material. Hereinafter, for sake of simplicity reference is made to an SMA wire, but other configurations of the SMA wire are conceivable.

The SMA wire provides a length change depending on its temperature. For example, an SMA wire can be configured to reversibly change its shape due to thermal activation between an extended state and a contracted state. The extended and contracted states may correspond with the closed and opened positions of the piston, respectively. The SMA wire may provide such a shape change due to phase transformation between two or more solid-state phases. Typically, the transformation is between a low-temperature phase/martensitic phase to a high-temperature phase/austenitic phase. Typically, the phase transformation is reversible and independent of time.

It is possible to activate the SMA wire by feeding an electric current to the SMA material, i.e., by using the SMA wire as an electric conductor. Due to the current flow, the SMA material is heated. The change in temperature causes the length change. In other examples, external heating elements arranged adjacent to the SMA wire could be employed, e.g., separate current-carrying wires, etc.

In the various examples described herein, different materials may be used for the SMA wire. Examples include a Nickel-Titanium (NiTi) alloy—e.g., binary NiTi alloys. For example, ternary or quaternary elements may be added to such a NiTi-based SMA wire, for example including carbon, oxide, copper, chromium, etc., Other examples for SMA wires include copper-based alloys such as CuZnAl or CuAlNi.

According to some examples, a normally-closed valve is provided. Hence, for a scenario in which an SMA wire is used, activation of the SMA wire-due to contraction—exerts a respective actuation force on the plunger to unseal a fluid port and to displace the plunger from its closed position to its opened position. A resilient member—e.g., a spring such as a compression spring or a leaf spring—is provided to exert a bias force on the plunger that tends to move the plunger to the closed position.

Thereby, upon stopping activation of the SMA wire, the plunger moves back to the closed position.

The techniques described herein enable the implementation of a linear geometry of the SMA wire with respect to the displacement direction of the plunger. As such, a co-linear or even co-axial motion of the plunger and the longitudinal axis of the SMA wire can be implemented. The SMA wire and the plunger can be co-linearly arranged. Alternatively or additionally, the resilient member can be arranged co-linearly with respect to the plunger.

For example, the SMA wire can extend along the displacement direction for at least 50% of its length, optionally for at least 80% of its length, further optionally of at least 90% of its length, further optionally of at least 95% of its length, further optionally of at least 99% of its length, further optionally of 100% of its length. Such a linear geometry enables to highly integrate the valve using compact dimensions for the housing. In particular, bulky lever-type arrangements are avoided. This facilitates a modular setup. Furthermore, if compared to lever-type arrangements or generally a rotational sealing, a particular tight sealing of a fluid port may be achieved. This may be due to a sealing surface of the plunger engaging tightly and uniformly with a fluid port.

According to various examples, a modular setup of the valve is provided. In particular, an actuator component can be used that provides for the displacement of the plunger. The actuator component includes the plunger and the actuator, e.g., implemented by an SMA wire and a resilient member. The plunger and the actuator can be assembled onto a carrier of the actuator component. The actuator component can then cooperate with a housing to form the valve together with the housing. I.e., the plunger can seal-off a fluid port formed in the housing. The plunger can move inside a fluid compartment formed by the housing.

As a general rule, a shape of the carrier and/or a material of the carrier can vary depending on the scenario. For instance, the carrier could be plate-shaped in a scenario in which a SMA actuator is used. The carrier could be rod-shaped in a scenario in which a solenoid actuator is used: for example, the carrier could implement a coil core. The carrier can be made from a plastic material.

The actuator component can be attached to the housing, e.g., to a bottom plate of the housing. A releasable connection can be provided. For instance, a clip-on functionality can be provided by respective structural engagement features. The actuator component can be attached to the housing so that the plunger, when moved to the closed position by the actuator, can seal-off a fluid port formed in the housing. The housing—e.g., together with a top plate—can form a fluid-flow compartment that defines and/or guides and/or constrains the fluid path. As a general rule, the actuator component can be arranged inside or outside of the fluid-flow compartment. The fluid-flow compartment can be in-between two or more fluid ports. Such a modular setup of the valve based on the actuator component and the housing provides for a simple and reliable assembly. In particular, it is possible to assemble the actuator and the plunger—e.g., in case of an implementation using an SMA wire, by attaching the SMA wire to the carrier and the plunger-even before mounting the actuator component to the housing. This facilitates the assembly, in particular in scenarios in which a multi-channel valve block is provided that includes multiple valves, wherein each valve is associated with one or more respective actuator components. Then each valve of the valve block, more specifically, each at least one actuator component of each valve can be separately assembled and only subsequently is it required to attach the multiple actuator components to the typically bulky housing of the valve block.

For instance, end-of-line testing of the functionality of each actuator component may be possible before attaching the actuator component to the housing. Thereby, it is possible to identify rejects for the actuator components, without compromising the overall integrity of a multi-channel valve block.

FIG. 1 illustrates aspects with respect to a valve 100 employing a SMA wire 151 to actuate a plunger 125. FIG. 1 illustrates a 2/2-valve; other configurations are conceivable.

The valve 100 of FIG. 1 can be part of a multi-channel valve block (not illustrated in FIG. 1). Here, multiple valves 100 configured in accordance with the valve 100 can be coupled in parallel.

In FIG. 1, a closed position 91 of the plunger 125 is illustrated in which the plunger 125 seals a fluid port 121. The valve 100 is closed.

FIG. 1 illustrates a linear geometry. Here, the SMA wire 151 extends along a longitudinal axis 111A of a housing 111 and of the plunger 125 for 100% of its length 251, albeit generally it would also be possible that the SMA wire 151 only extends along the axis 111A for a smaller fraction of its length 251. The housing 111 includes two long side surfaces 1111, 1112 and two short side surfaces 1113, 1114.

The fluid port 121 is arranged in the short side surface 1113. A further fluid port 122 is arranged in the opposing short side surface 1114, albeit it could also be arranged in one of the long side surfaces 1111, 1112. In between the fluid ports 121, 122, there is defined a fluid flow path. As is apparent from FIG. 1, the linear shape of the housing 111 correlates with the linear arrangement of the SMA wire 151.

The SMA wire 151 has two ends 351, 352. The end 351 is coupled with the plunger 125. The end 352 is at a fixed position with respect to the reference frame of the housing 111. For this, a connection piece such as a crimp connection or alternative connections (e.g. knotting, welding, screwing, . . . ) may be employed. A length change of the SMA wire 151 results in a displacement of the plunger 125 away from a fluid port 121 (not shown in FIG. 1).

In the example of FIG. 1, the SMA wire 151 extends along its entire length 251 between the fluid ports 121, 122 defining the fluid flow path. In other words, the SMA wire 151 extends between the opposing sides 1113, 1114 of the housing 111 in which the fluid ports 121, 122 are arranged. Generally speaking, the SMA wire 151 may extend along at least 20%, optionally at least 50%, further optionally at least 90% of its entire length 251 between the fluid ports 121, 122. The SMA wire 151 and the plunger 125 are co-linearly arranged. This facilitates a compact design of the valve 100—in particular if compared to scenarios where the SMA wire 151 extends away from the fluid flow path. Also, a tight engagement between a sealing surface of the plunger 125 and, e.g., an O-ring of the fluid port 121 can be facilitated.

Figure 2:
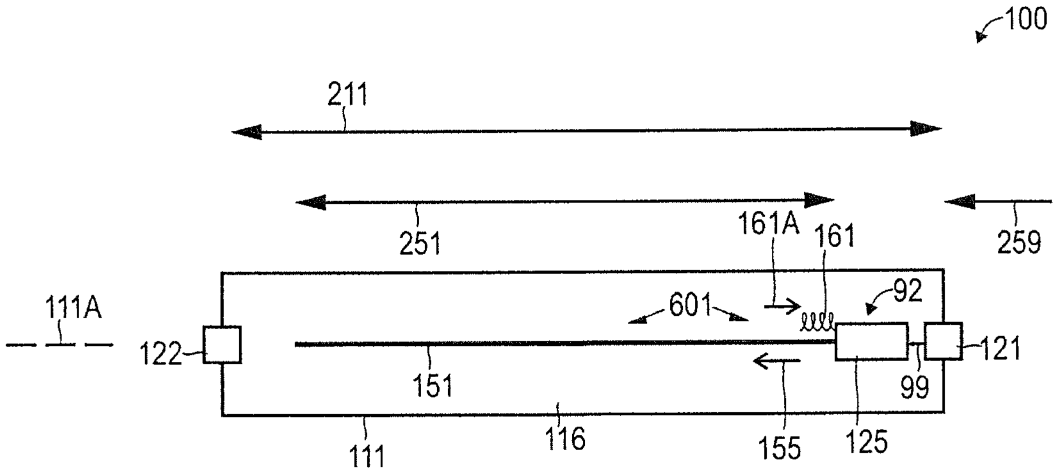
FIG. 2 schematically illustrates the valve of FIG. 1, were in the valve is operated in an opened position.

FIG. 2 illustrates aspects with respect to the valve 100 according to the example of FIG. 1. Different to FIG. 1, in FIG. 2, the opened position 92 of the plunger 125 is illustrated in which the plunger 125 does not seal the fluid port 121. Thus, a fluid may enter or exit the inner part of the housing 111 via the fluid port 121.

In FIG. 2, a displacement direction 259 of the plunger 125 is illustrated. When the SMA wire 151 contracts, it exerts an actuation force 155 on the plunger 125. The SMA wire 151 pulls the plunger 125 along the displacement direction 259 (horizontally, towards the left in FIG. 2). This actuation force 155 causes the plunger 125 to move/displace along the displacement direction 259. The displacement direction 259 is aligned with an axial direction of the plunger 125. The respective displacement 99 of the plunger 125 from the closed position 91 to the open position 92 is illustrated in FIG. 2. This displacement 99 is parallel to the displacement direction 259. For example, to guide the displacement 99 along the displacement direction 259, guide slots or through holes may be provided in which the plunger 125 is arranged (not shown in FIG. 2).

The SMA wire 151, in the example of FIG. 2, extends along the displacement direction 259 for 100% of its length-hence, a fully co-linear design is implemented; in other examples, the SMA wire 151 could extend along the displacement direction 259 for a smaller fraction of its length 251, e.g., for at least 50% of its length 251, optionally for at least 90% of its length, further optionally for at least 95% of its length.

Such a fully or partly co-linear design of the plunger 125 and the SMA wire 151 enables to implement the valve 100 with a small footprint. Also, the actuation force is efficiently transmitted from the SMA wire 151 to the plunger 125. Furthermore, complex lever-type geometry is not required and a tight sealing engagement between the plunger 125 and the fluid port 121 can be achieved.

Typically, the absolute length change of the SMA wire 151 is limited to some value in order to avoid non-elastic deformation and damage. The length change corresponds to strain. For example, typical strain may be limited to 3-7%. In order to nonetheless provide a sufficiently large displacement 99 of the plunger 125, the length 251 of the SMA wire 151 can be dimensioned sufficiently large. Then, even a small strain results in a significant displacement 99. Example implementations provide a length 251 of the SMA wire 151 in the range of 10 millimeters-50 millimeters, optionally in the range of 25 millimeters-35 millimeters. For example, here, a 2% length change of the SMA wire 151 results in a displacement of approximately 0.6 millimeters.

As illustrated in FIG. 1 and FIG. 2, the valve 100 further includes a resilient member 161. In the example of FIG. 1 and FIG. 2, the resilient member 161, the plunger 125, and the SMA wire 151 are all co-linearly arranged. Also the resilient member 161, e.g., a compression spring, extends along the displacement direction 259.

Example implementations of the resilient member 161 include a leaf spring, or a coiled compression spring, or another elastic element such as a rubber element, etc., The resilient member 161 is configured to exert a bias force 161A onto the plunger 125. The bias force 161A generally urges the plunger 125 into the closed position 91, because in the example of FIGS. 1 and 2 a normally-closed valve 100 is provided. The bias force 161A generally opposes the actuation force 155 of the SMA wire 151. During displacement from the closed position 91 towards the opened position 92, the actuation force 155 is larger in magnitude than the bias force 161A. This causes the plunger 125 to move. In the opened position 92, the bias force 161A and the actuation force 155 may be in equilibrium. Alternatively or additionally, a stop member could be provided physically limiting further displacement of the plunger 125 beyond the opened position 92. A limit switch may be used to limit further contraction of the SMA wire 151.

In the example of FIG. 2, the resilient member 161 is arranged on the same side of the plunger 125 as the SMA wire 151. Here, the bias force 161A may result from a compression of the resilient member 161. In other examples, it would also be possible that the resilient member 161 is arranged in between the plunger 125 and the fluid port 121, i.e., on the opposing side of the plunger 125 if compared to the SMA wire 151. Then, the bias force 161A may result from an extension of the resilient member 161.

In the example of FIG. 1 and FIG. 2, a modular setup can be used. Here, an actuator component 601 is formed by the following elements: plunger 125, SMA wire 151, and resilient member 161. The actuator component 601 can, thus, be assembled separately from the housing 111. The actuator component 601 can, after being assembled, be attached to the housing 111, to thereby form the valve 100 including the fluid flow path between the fluid ports 121, 122.

The actuator component 601 according to the example of FIGS. 1 and 2 can be modified in other examples. For example, it would be possible to use more than a single SMA wire 151 or another arrangement of the SMA wire 151. This is illustrated in connection with the following FIGS.

Figure 3:
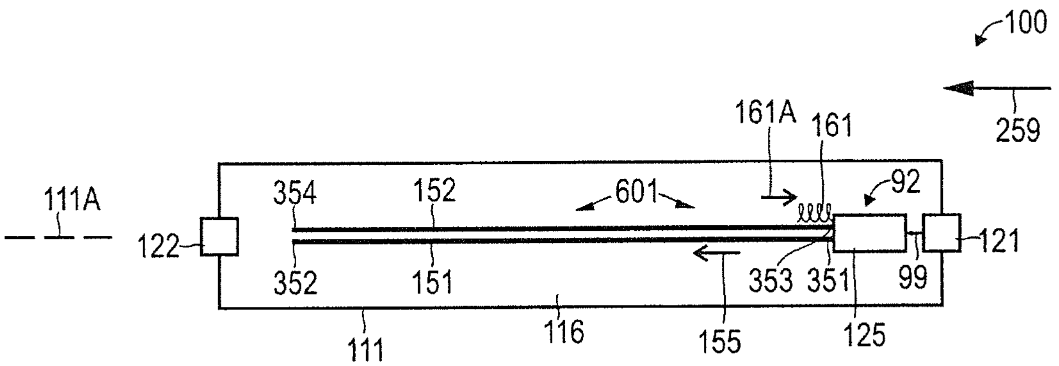
FIG. 3 schematically illustrates a valve according to various examples.

FIG. 3 illustrates aspects with respect to a valve 100 in which the actuator component 601 employs two SMA wires 151, 152 to actuate the plunger 125. Aside from the use of multiple SMA wires 151, 152, the valve 100 according to the example of FIG. 3 generally corresponds to the valve 100 according to the example of FIGS. 1 and 2.

The end 351 of the SMA wire 151 is coupled with the plunger 125. The end 353 of the SMA wire 152 is likewise coupled with the plunger 125. The end 352 of the SMA wire 151 is fixed with respect to the reference frame of the housing 111. Likewise, the end 354 of the SMA wire 152 is fixed with respect to the reference frame of the housing 111.

In other examples, it would be possible to use an even larger number of SMA wires in order to actuate the plunger 125. For example, a count of three or four or five SMA wires could be used. Generally, the various SMA wires can be arranged co-linearly with respect to each other and with respect to the displacement direction 259. The use of multiple SMA wires enables to increase the actuation force 155 provided by the multiple SMA wires; while avoiding overload with respect to each individual SMA wire. The stress per SMA wire can be reduced. It would also be possible to increase the total force provided by the multiple SMA wires, while the stress on each individual SMA wire remains constant. Such various design options can also be combined.

Figure 4:
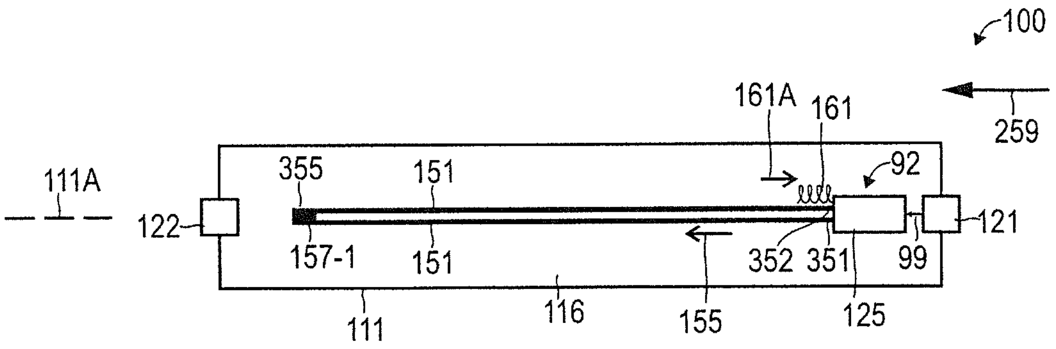
FIG. 4 schematically illustrates a valve according to various examples.

FIG. 4 illustrates aspects with respect to a valve 100 employing a single SMA wire 151. The SMA wire 151 is co-linearly arranged with the plunger 125 and the resilient member 161, i.e., the displacement direction 259. In the example of FIG. 4, the SMA wire 151 is arranged in a U-shape. In other words, the SMA wire 151 includes two sections which are arranged anti-parallel with respect to each other (upper and lower part of the SMA wire 151 in FIG. 4).

Both ends 351, 352 of the SMA wire 151 are coupled to the plunger 125. In a middle region 355 of the SMA wire 151—arranged in between the end 351, 352—the SMA wire 151 is wound about a fixture 157-1 fixedly arranged with respect to the reference frame of the housing 111. The example scenario illustrated in FIG. 4 allows to provide a significant actuation force 155 and/or a significant displacement 99 due to the U-shaped arrangement of the SMA wire 151; at the same time, the number of electrical contacts to feed the heating current into the SMA wire 151 is limited (in particular if compared to the scenario of FIG. 3 using multiple distinct SMA wires). This simplifies the arrangement.

Figure 5:
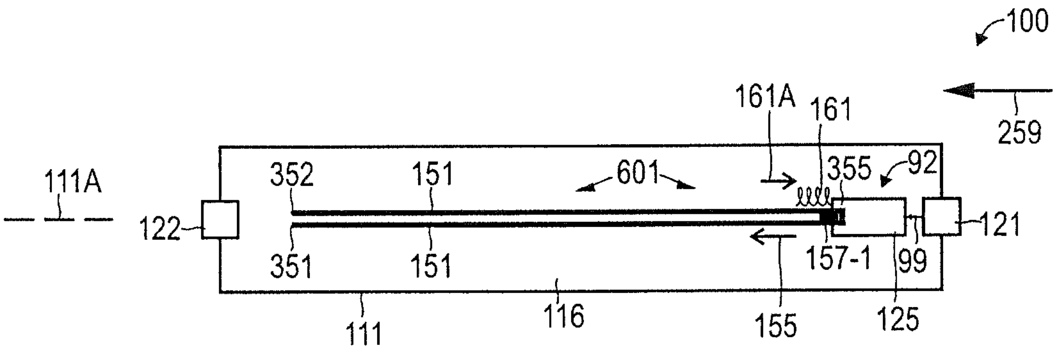
FIG. 5 schematically illustrates a valve according to various examples.

FIG. 5 illustrates aspects with respect to a valve 100 employing a single SMA wire 151. The SMA wire 151 is co-linearly arranged with the plunger 125 and the resilient member 161. The example of FIG. 5 generally corresponds to the example of FIG. 4, but employs a somewhat inverted geometry. Here, the fixture 157-1 is coupled with the plunger 125 and the ends 351, 352 of the U-shaped SMA wire 151 are fixed in the reference frame of the housing 111. For example, the fixture 157-1 may be built into the plunger 125 and may, optionally, be formed integrally with the plunger 125. The fixture 157-1 can receive and engage the U-shaped section of the SMA wire 151, when assembling the actuator component 601. The fixture 157-1 could be implemented by a groove or slot or recess in a body of the plunger 125.

Figure 6:
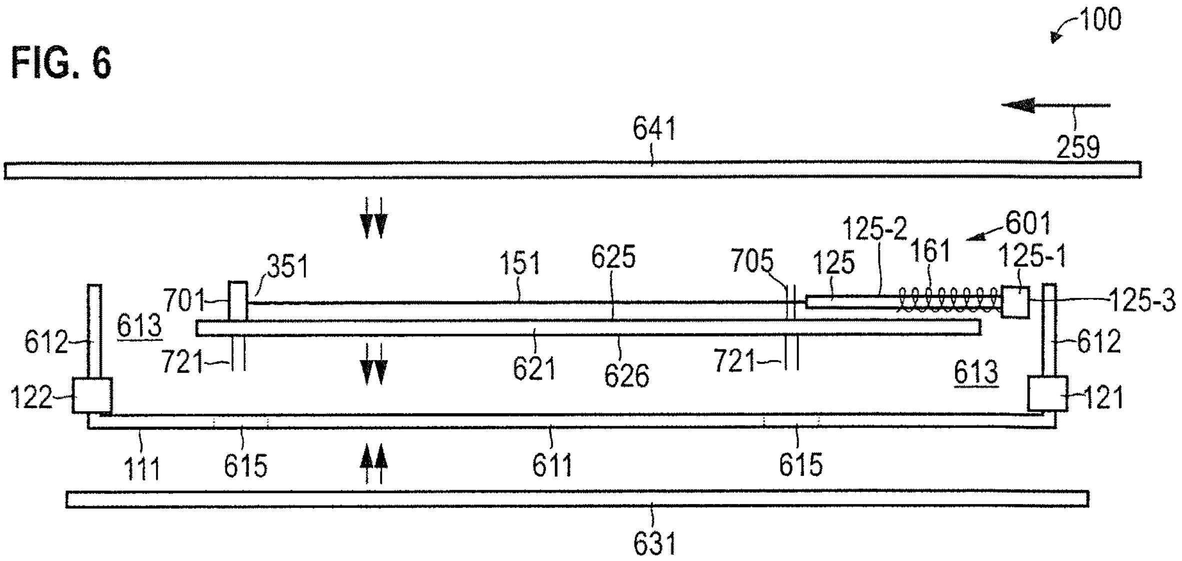
FIG. 6 is a schematic side view of a valve according to various examples, wherein the valve is formed by an actuation actuator component and a housing.

FIG. 6 illustrates aspects with respect to a valve 100 including a SMA wire 151 or multiple SMA wires that are co-linearly arranged. The valve 100 according to the example of FIG. 6 can be configured in a similar manner as discussed above, e.g., in connection with any 1 of FIG. 1 to FIG. 5.

FIG. 6 is a schematic side view. FIG. 6 schematically illustrates aspects with respect to the modular setup of the valve 100. More specifically, FIG. 6 schematically illustrates the actuator component 601 comprising the SMA wire 151, the plunger 125, and the resilient member 161. The SMA wire 151, the plunger 125, and the resilient member 161 are all attached to a carrier 621. The carrier 621 is plate-shaped in the scenario of FIG. 6, but, as a general rule, could have other shapes, e.g., rod-shaped. The plunger 125 includes a plunger body 125-2 and a plunger cap 125-1; the plunger cap 125-1 forms a sealing surface 125-3 that is arranged at the top end of the plunger 125 (extending radially) and that can sealingly engage with the fluid port 121 to seal the fluid port 121 in the closed position 91 (cf. FIG. 1). The fluid port 121 is arranged in a side part 612 of the housing 111, extending away from a bottom plate 611 of the housing 111.

FIG. 6 is an exploded schematic side view of the valve 100. In particular, in FIG. 6 a manufacture state is illustrated in which the actuator component 601 is assembled, but the actuator component 601 has not yet been attached to the housing 111. As illustrated by the vertical arrows in FIG. 6, it is possible to attach the actuator component 601 to the housing 111. More specifically, the carrier 621 is of elongated shape and extends along the displacement direction 259. The carrier 621 has an upper surface 625 and a bottom surface 626. The plunger 125, the SMA wire 151, and the resilient member 161 all extend along the upper surface 625. Then, the bottom surface 626 can be brought into contact with the bottom plate 611 of the housing 111.

Then, the actuator component 601 is arranged in-between the fluid ports 121-122 in the fluid flow path.

FIG. 6 also schematically illustrates aspects with respect to the electric actuation of the SMA wire 151. The actuator component 601 includes electrical contacts 701 (in FIG. 6 only a single electrical contact is illustrated, for sake of simplicity; e.g., in a U-shaped setup of the SMA wire 151 (cf. FIG. 5) it would be possible that multiple electrical contacts 701 are arranged next to each other approximately at the same position of the carrier 621. An electrical current can be fed into the SMA wire 151 via the electrical contacts 701. For instance, the electrical contacts 701 could be implemented by crimp connectors attached to the SMA material of the SMA wire 151.

Also illustrated in FIG. 6 are electrical pins 721 that extend away from the bottom surface 626 of the carrier 621. The electrical current can be provided to the electrical contacts 701 via the electrical pins 721.

Upon attaching the actuator component 601 to the housing 111, the electrical pins 721 extend through through holes 615 formed in the bottom plate 611 of the housing 111. The through holes 615 can, thus, receive the electrical pins 721. Then, a circuit board 631 can be attached to the bottom plate 611 (then, the bottom plate 611 can be arranged in between the actuator component 601 and the circuit board 631). Using the circuit board 631, the electrical current used to actuate the SMA wire 151—or generally any other type of electrical actuator—can be controlled and provided.

Illustrated in FIG. 6 is, furthermore, an electrical limit switch 705. For instance, the limit switch 705 could be implemented by circuitry that includes a contact pin and a counter electrode. The electrical limit switch 705 is arranged with respect to the plunger 125. Upon displacement of the plunger 125 along the displacement direction 259, the plunger 125 can trigger the electrical limit switch 705. Then, the electrical current used to activate the SMA wire 151 can be reduced, e.g., by varying duty cycle and/or an amplitude, so as to prevent any further displacement of the plunger 125. Also the electrical limit switch 705 can be contacted by the circuit board 631 via respective pins 721 that extend away from the bottom surface 626 of the carrier 621 and can be received in through holes 615 of the bottom plate 611 of the housing 111.

FIG. 6 also illustrates aspects with respect to a top plate 641. The top plate 641 can be attached to the housing 111, so as to form a fluid-flow compartment 613. More specifically, the top plate 614 can sealingly engage top ends of the side parts 612 of the housing 111. The actuator component 601 is arranged in the fluid-flow compartment 613. The fluid flow path is defined within the fluid-flow compartment 613 and sealed-off against the environment. Next, details with respect to the manufacturing of the valve 100 and optionally of a multi-channel valve block or even a system including multiple valve blocks are discussed in connection with FIG. 7.

Figure 7:
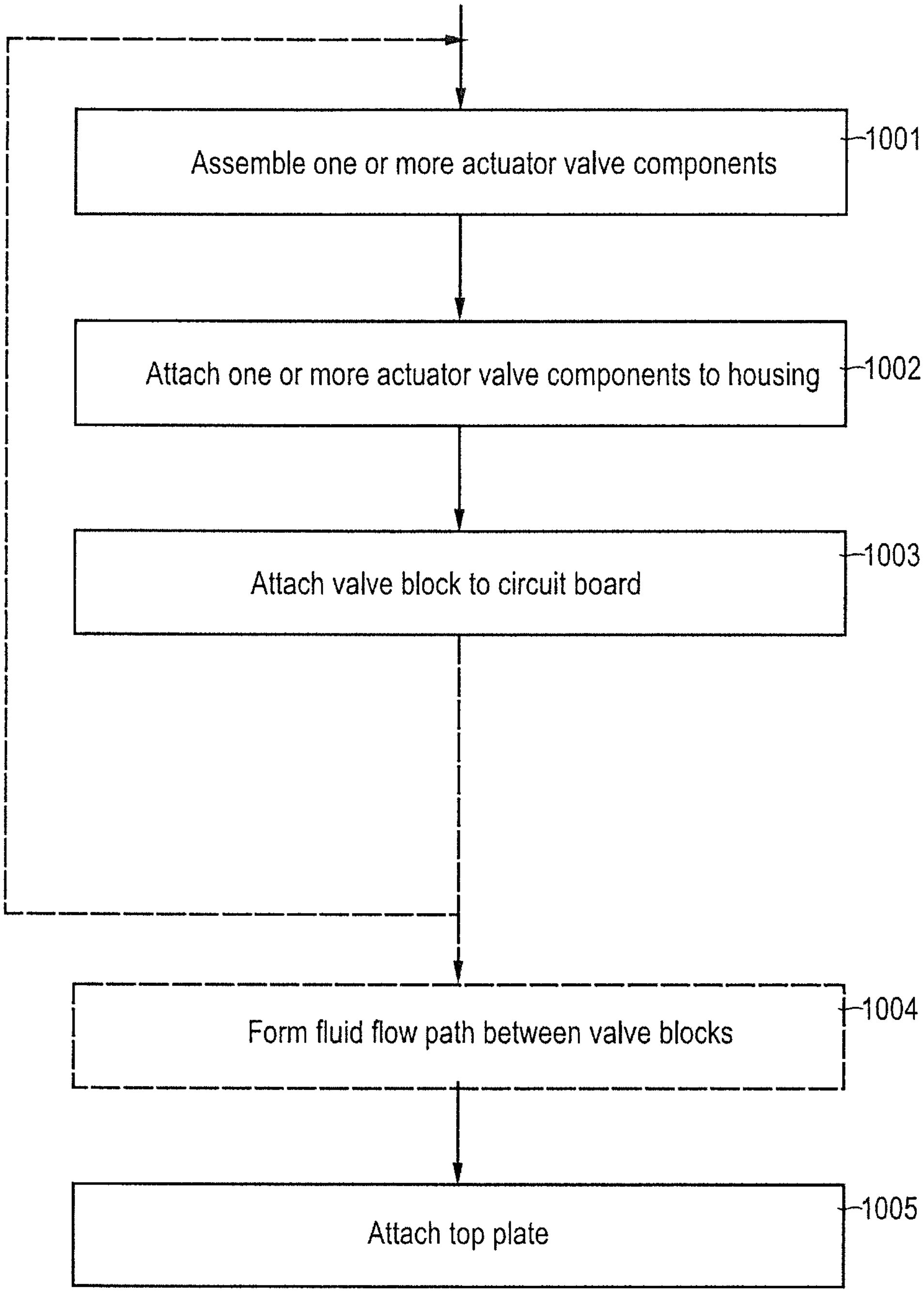
FIG. 7 is a flowchart of a method according to various examples.

FIG. 7 is a flowchart of a method according to various examples. The method of FIG. 7 enables to manufacture a valve, a multi-channel valve block that includes multiple valves fluidly coupled with each other, or even multiple valve blocks fluidly coupled with each other (i.e., a system of valve blocks). Thus, the method of FIG. 7 enables manufacture using a modular setup.

At box 1001, one or more actuator components 601 can be assembled. Each one of the one or more actuator components includes at least a respective carrier, a plunger, and an actuator to move the plunger 125 between an opened position and a closed position. For example, an actuator component 601 as discussed above in connection with FIGS. 1 to 6 could be used. Another option includes using a solenoid or piezoelectric actuator.

Depending on the design of the actuator component 601, different implementations of box 1001 are conceivable. Some aspects with respect to a possible implementation of the assembly of box 1001 are discussed in connection with FIG. 8.

Figure 8:
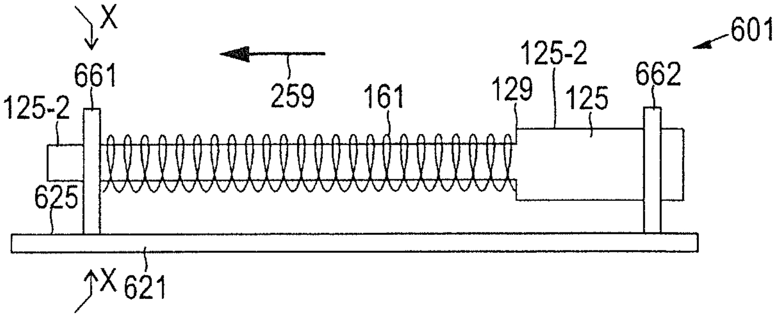
FIG. 8 is a schematic illustration of a relative arrangement of a plunger, a compression spring, and a carrier of an actuation actuator component according to various examples.
Figure 8:
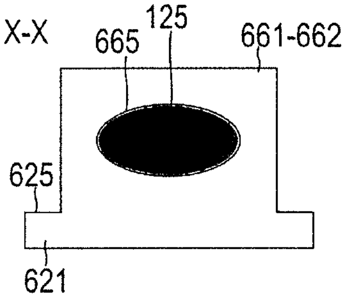

FIG. 8 is a schematic side view of parts of the actuator component 601 illustrating the resilient member 161, here implemented by a compression spring 161 that is coiled or wound around the plunger 125. The plunger 125 could be moved, e.g., by a solenoid actuator or an SMA actuator or a piezoelectric actuator. The plunger 125 is attached to the carrier 621 using posts 661-662 having through holes 665 (cf. inset of FIG. 8 that illustrates a cross-sectional view along the line X-X). The through holes 665 and the plunger 125 have a non-circular cross-section, so as to avoid rotation of the plunger 125 within the through holes 665. This has been found to provide additional stability avoiding wear-out of the actuator. Thus, the assembly at box 1001 (cf. FIG. 7) can include inserting the plunger 125, more specifically a plunger body 125-2, into the through holes 665 formed on top of the carrier 621. Before inserting the plunger 125 into the through hole 665, it would be possible to insert the plunger 125 into the compression spring 161.

The plunger 125 includes a radial protrusion 129 and the compression spring 161 abuts against a respective engagement surface formed by the radial protrusion 129 of the plunger 125. In particular, it is possible that the radial protrusion extends 360° in the circumferential direction of the plunger 125; this has been found to provide a evenly distributed bias force 161A as a function of the displacement 99. This helps to reduce wear-out of the actuator, e.g., of the SMA wire 151.

Some further aspects with respect to a possible implementation of the assembly of box 1001 (cf. FIG. 7) are discussed in connection with FIG. 9, wherein in FIG. 9 a scenario is illustrated in which the actuator is implemented by an SMA wire 151.

Figure 9:
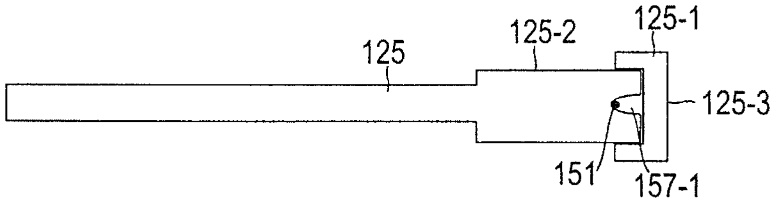
FIG. 9 is a schematic illustration of a relative arrangement of the SMA wire and the plunger of the actuation actuator component according to various examples.

FIG. 9 is a schematic side view of parts of the actuator component 601 illustrating the plunger 125 having the plunger cap 125-1 that defines the sealing surface 125-3. The fixture 157-1 of the SMA wire 151 to the plunger 125 is implemented by a recess formed at a top part of the plunger 125. For instance, this can be helpful for a U-shaped implementation of the SMA wire 151 (cf. FIG. 5). A middle section of the SMA wire 151 can then be guided in the recess. Thus, the assembly of box 1001 can include inserting the SMA wire 151 into the recess of the fixture 157-1 and then attaching the plunger cap 125-1.

Again referring to box 1001 of FIG. 7, assembling the one or more actuator components 601 may further include, e.g., connecting electrical contacts of the actuator to one or more electrical pins. For instance, in a scenario in which an SMA wire 151 is used as an actuator, the SMA wire can be crimped to respective electrical contacts.

FIG. 7 also illustrates the attachment of the one or more actuator components to the housing 111, at box 1002. For instance, the actuator components may only be attached to the housing 111 upon successfully passing an end-of-line test testing the functionality of displacement of the plunger between an opened position and a closed position.

For instance, it would be possible to use a press fit of the carrier 621 to the bottom plate 611 of the housing 111. To this end, the bottom plate 611 and/or the carrier 621 can include respective protrusions and interrelated engagement surfaces or indentations in order to establish the press fit.

It is possible to individually attach each one of the one or more actuator components 601 to the housing 111. I.e., it would be possible to sequentially attach multiple actuator component 601, e.g., using a pick-and-place process. This can simplify the attachment process and, furthermore, make the attachment process more reliable.

When attaching the one or more actuator components 601 to the housing 111, the electrical pins 721 can be received by respective through holes 615 in the bottom plate 611 of the housing 111. The electrical pins 721 can be used to provide a supply current to the electrical actuator. The electrical pins 721 can be attached to a bottom surface of the carrier.

As part of box 1002, it would also be possible to seal the through hole 615 using a sealant. Thereby, the fluid flow path between the fluid ports 121-122 can be sealed off against the environment. The sealant can also provide adhesive properties so as to lock into position the one or more actuator components 601 with respect to the housing 111. The SMA wire 151 cannot loose during operation.

At box 1003, the housing 111, can be attached to a circuit board 631. The circuit board is arranged adjacent to the bottom surface of the bottom plate 611 of the housing 111

(cf. FIG. 6). The circuit board 631 can contact the electrical pins 721 arranged in the through holes 615.

Thereby, one or more valves 100 are formed. Where multiple valves are formed in a common housing, this can be referred to a multi-channel valve block. In some scenarios, it would even be possible to prepare a system of multiple valve blocks. This is illustrated in FIG. 10.

Figure 10:
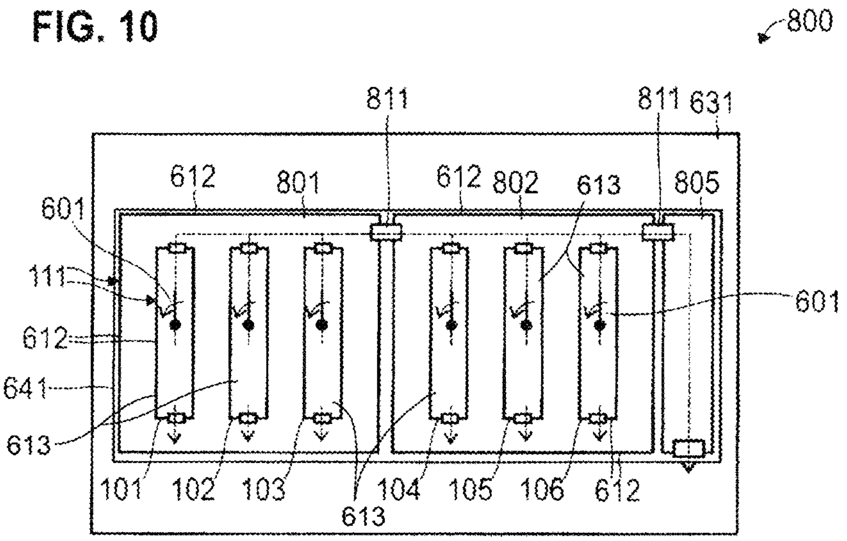
FIG. 10 schematically illustrates a system of multiple valve blocks fluidly coupled with each other according to various examples.

FIG. 10 schematically illustrates aspects with respect to a system 800 including two serially coupled valve blocks 801-802. The valve block 801 includes multiple valves 101-103 and the valve block 802 includes multiple valves 104-106; these valves 101-106 can be configured as discussed above in connection with the valve 100. Each valve 101-106 includes a respective actuator component 601 formed in a fluid-flow compartment 613 formed by the housing 111. The actuator component 601 includes a plunger and an electrical actuator, e.g., an SMA actuator or another actuator. The actuator component 601 may include a carrier.

The system 800 also includes a pump line block 805. The valve block 801 is connected to the pump line block 805 via the valve block 802.

As a general rule, the system 800 could include more than two valve blocks 801-802. The system 800 could include valve blocks coupled serially and/or in parallel.

In between the valve blocks 801-802 and the pump line block 805, there are arranged respective connection components 811 that are configured to establish the fluid flow path (illustrated in FIG. 10 by the dashed lines) in between the valve blocks 801-802 and the pump line block 805. According to various examples, these connection components 811 each include a respective elastic element (not shown in FIG. 10). The elastic element can deform so as to provide a positional degree of freedom, e.g., a translational degree of freedom and/or a rotational degree of freedom, for the relative displacement between the adjacent valve blocks 801-802 and the pump line block 805, respectively. For example, the elastic element could be implemented by a rubber cannula inserted into respective holes formed in the housings of the valve blocks 801-802 and the pump line block 805, respectively. By means of such flexibility in the positioning of the constituents 801-802, 805 of the system 800 with respect to each other, it is possible to use a single, shared circuit board 631. In particular, it is possible to flexibly connect the respective actuator components 601 via the pins 721 to the circuit board 631, wherein the circuit board 631 typically has respective contacts of limited extent that need to be accurately hit with the pins 721. This can be facilitated by, firstly, individually placing each valve block 801-802 onto the circuit board 631 (cf. FIG. 7: box 1003), and, only subsequently, connecting the valve blocks 801-802 with each other by forming the fluid flow path using the connection components 811. This is also illustrated in FIG. 7 in connection with box 1004.

After attaching all valve blocks to the circuit board, i.e., after multiple iterations of box 1003 (where necessary), and after forming the fluid-flow paths between the housings, at box 1005, it is then possible to attach the top plate 641 (cf. FIG. 6). In particular, the top plate 641 can be shared by the multiple blocks 801-802, 805. I.e., the top Thereby, the fluid flow path between the fluid ports 121-122 is sealed off against the environment. The top plate 641 can be shared between multiple valves 100 of the multi-channel valve block.

Next, a practical implementation of an actuator component 601, a respective valve 100, a multi-channel valve block 801, and a system including multiple blocks, etc. will be discussed in connection with the following FIGS.

Figure 11:
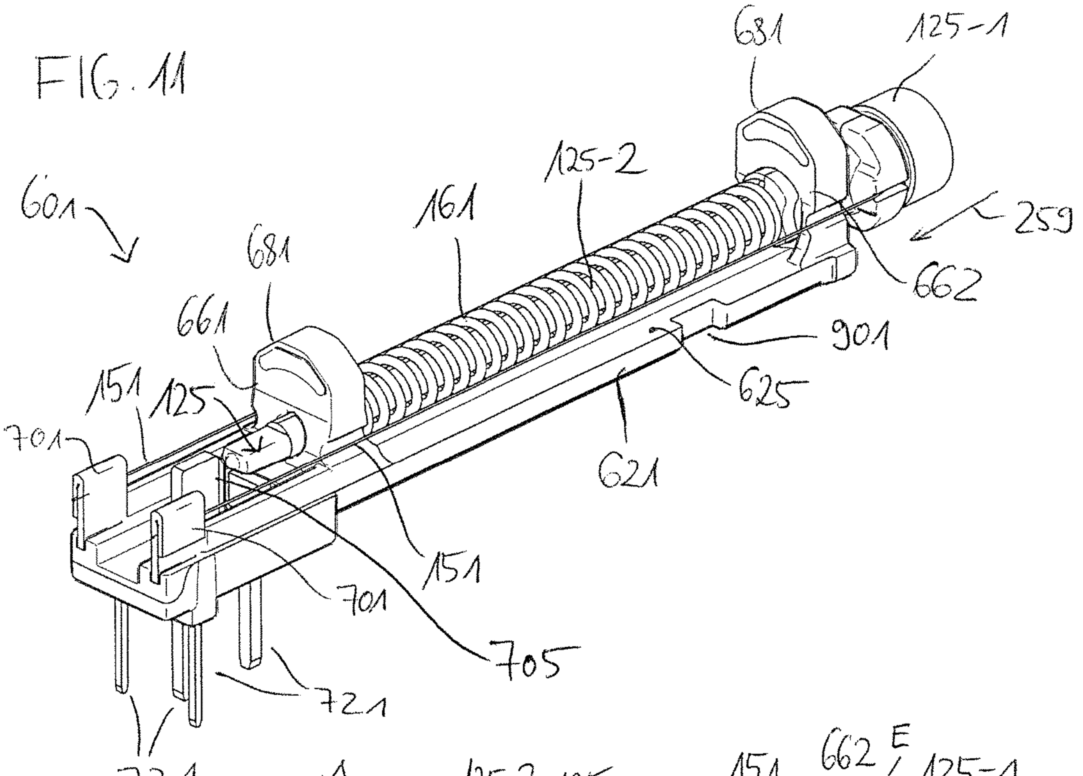
FIG. 11 is a perspective view of an example implementation of an actuation actuator component according to various examples.

FIG. 11 is a perspective view of an implementation of the actuator component 601 according to various examples. In the illustrated example, the SMA wire 151 is arranged in a U-shape, similar to the schematic illustration of FIG. 5. The compression spring 161, the SMA wire 151, and the plunger 125 are all co-linearly arranged, with respect to the displacement direction 259. The compression spring 161 is coiled about the plunger 125. The plunger 125 includes a plunger body 125-2 that carries the compression spring 161 and a plunger cap 125-1 that is attached to the plunger body 125-2. The plunger body 125-2 is inserted into through holes formed in two posts 661-662 on top of the carrier 621.

Figure 12:
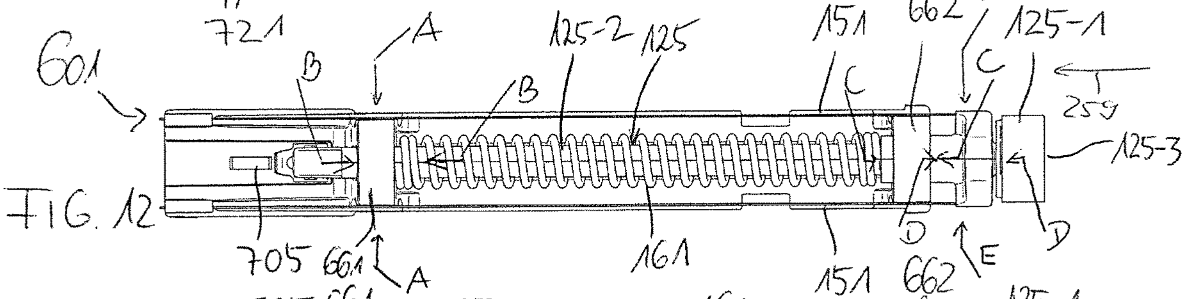
FIG. 12 is a top view of the actuation actuator component of FIG. 11.

FIG. 12 is a top view of the actuator component 601 of the example of FIG. 11.

Figure 13:
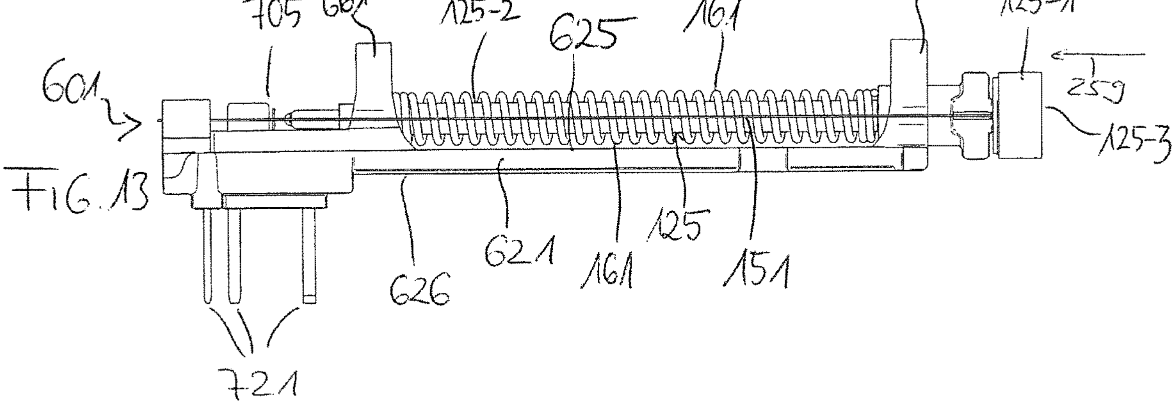
FIG. 13 is a side view of the actuation actuator component of FIG. 11.

FIG. 13 is a side view of the actuator component 601 of the example of FIG. 11.

The actuator component 601 can then be attached to the housing 111. This is illustrated in FIG. 14 and FIG. 15.

Figure 14:
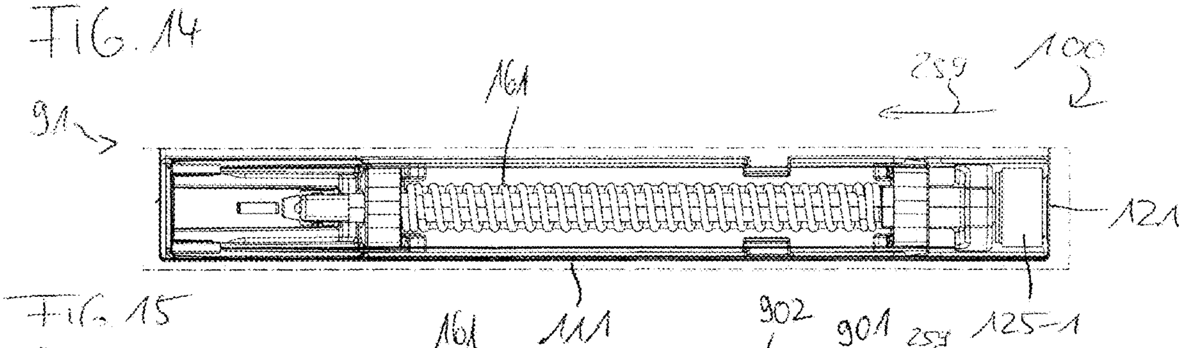
FIG. 14 is a top view of the actuation actuator component of FIG. 11 when attached to a housing, thereby forming a valve according to various examples, wherein the valve is operated in a closed position.
Figure 15:
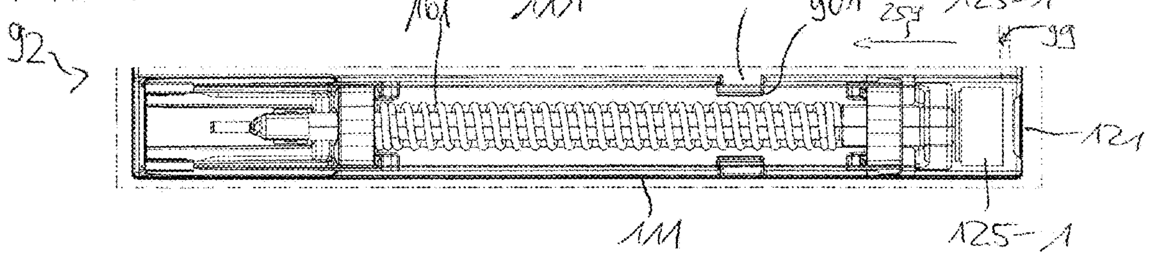
FIG. 15 corresponds to FIG. 14, wherein the valve is operated in an opened position.

FIG. 14 and FIG. 15 are top views of the actuator component 601 of the example of FIG. 11, when attached to the housing 111. Thus, a valve 100 is illustrated. The valve 100 may be part of a multi-channel valve block.

FIG. 14 illustrates the closed position 91 (cf. FIG. 1) and FIG. 15 illustrates the opened position 92 (cf. FIG. 2) of the plunger 125.

In the closed position 91, a sealing surface 125-3 of the plunger cap 125-1 engages with a circumference of the fluid port 121, e.g., an O-ring.

Figure 16:
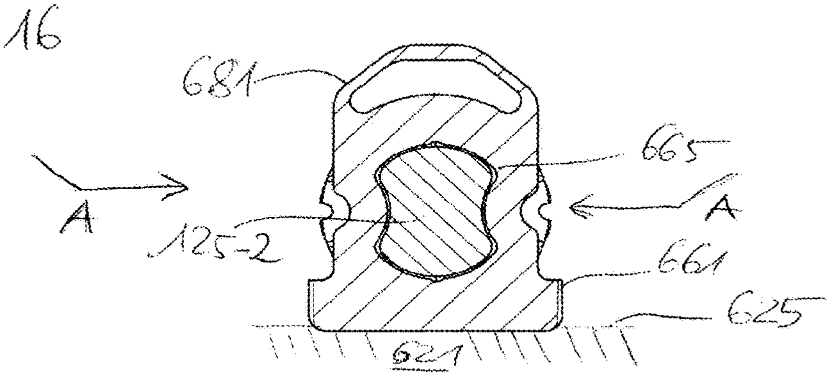
FIG. 16 is a cross-sectional view of the example implementation of the actuation actuator component of FIG. 11, wherein the cross-sectional view is defined with respect to FIG. 12.

FIG. 16 illustrates aspects with respect to the post 661. FIG. 16 is a cross-sectional view along the line A-A denoted in FIG. 12. The post 661 includes a through hole 665 into which the plunger body 125-2 is inserted. The radius of the through hole 665 correlates with the radius of the plunger body 125-2. The radius varies (non-circular cross-section) so that the plunger 125 cannot rotate.

FIG. 16 also illustrates an elastic member 681 having form-induced elasticity that extends away from the upper surface 625 of the carrier 621. The elastic member 681 can engage with the top plate 641 (cf. FIG. 6), to thereby press the carrier 621 against the bottom plate 611 of the housing 111. By providing the elasticity, there is provided for of tolerance and the vertical positioning of the actuator component 601 with respect to the housing 111.

Figure 17:
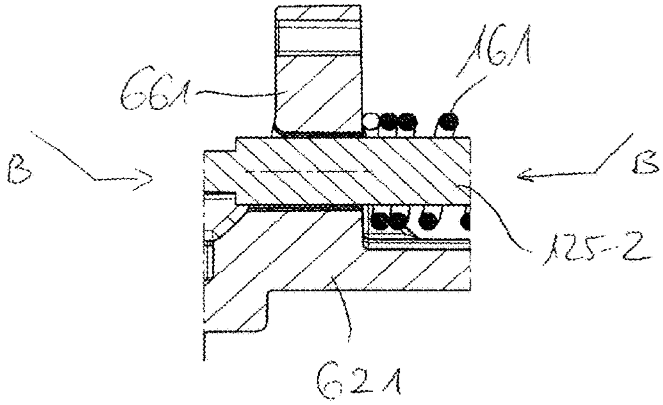
FIG. 17 is a cross-sectional view of the example implementation of the actuation actuator component of FIG. 11, wherein the cross-sectional view is defined with respect to FIG. 12.

FIG. 17 illustrates aspects with respect to the post 661. FIG. 17 is a cross-sectional view along the line B-B denoted in FIG. 12. As illustrated in FIG. 17, there is an engagement surface provided by the post 661 and the compression spring 161 abuts against the engagement surface. The engagement surface is formed along the entire circumference of the plunger body 125-2, such that a continuous (and even linear) force profile without peaks can be provided for the bias force 161A. Spring ends are not required to be clamped. The other end of the compression spring 161 is illustrated in FIG. 18.

Figure 18:
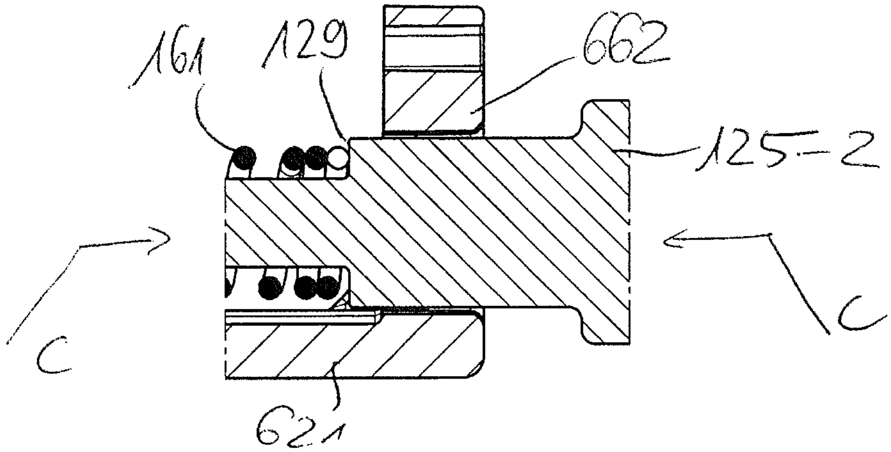
FIG. 18 is a cross-sectional view of the example implementation of the actuation actuator component of FIG. 11, wherein the cross-sectional view is defined with respect to FIG. 12.

FIG. 18 illustrates aspects with respect to the post 662 and the plunger 125, more specifically, the plunger body 125-2. FIG. 18 is a cross-sectional view along the line C-C denoted in FIG. 12. As illustrated, the plunger body 125-1 includes a radial protrusion 129 that extends in the entire circumferential direction of the plunger 125. The compression spring 161 abuts against the engagement surface formed by the radial protrusion 129 of the plunger body 125-2. Again, this helps to provide a continuous force profile for the bias force 161A.

Figure 19:
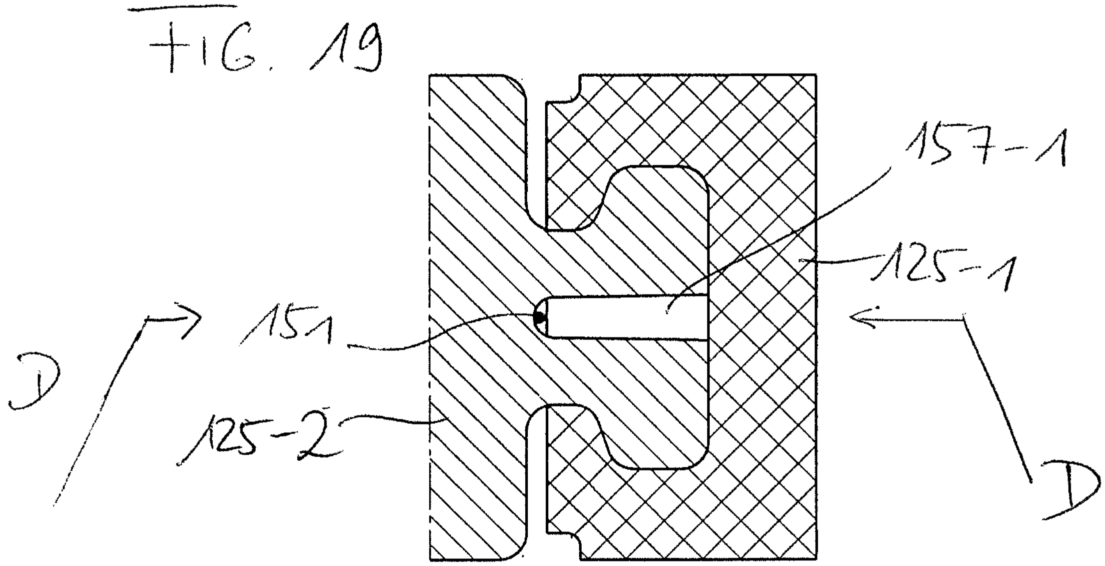
FIG. 19 is a cross-sectional view of the example implementation of the actuation of component of FIG. 11, wherein the cross-sectional view is defined with respect to FIG. 12.

FIG. 19 illustrates aspects with respect to the plunger 125. More specifically, FIG. 19 illustrates aspects with respect to the attachment of the plunger cap 125-1 to the plunger body 125-2. As illustrated in FIG. 19, the plunger cap 125-1 is clipped onto the plunger body 125-2. The plunger body 125-2, for this purpose, includes an end piece that can receive the respective cavity formed by the plunger cap 125-1.

Figure 20:
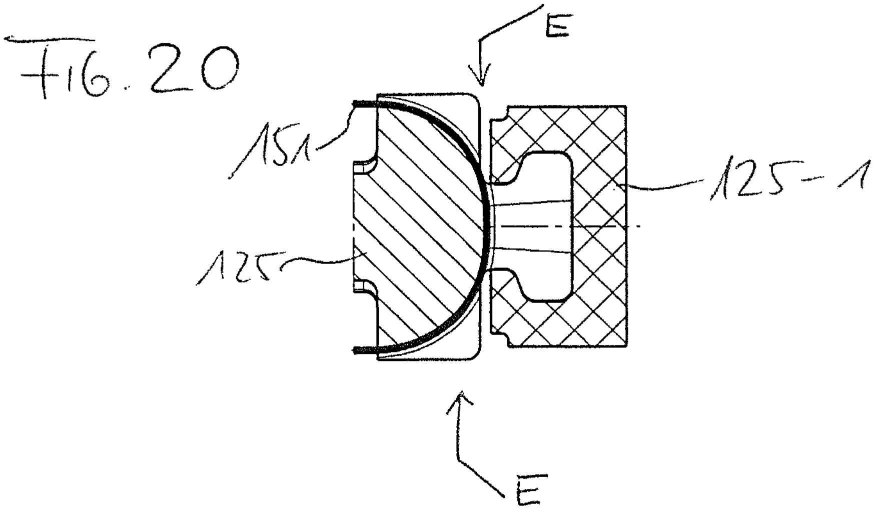
FIG. 20 is a cross-sectional view of the example implementation of the actuation actuator component of FIG. 11, wherein the cross-sectional view is defined with respect to FIG. 12.

This end piece also includes a recess forming the fixture 157-1 into which the SMA wire 151 is inserted. Upon inserting the SMA wire 151, the plunger cap 125-1 can be attached to the end piece thereby locking the SMA wire 151 into position. This is also illustrated by FIG. 20 which is a cross-sectional view along the line E-E.

Figure 21:
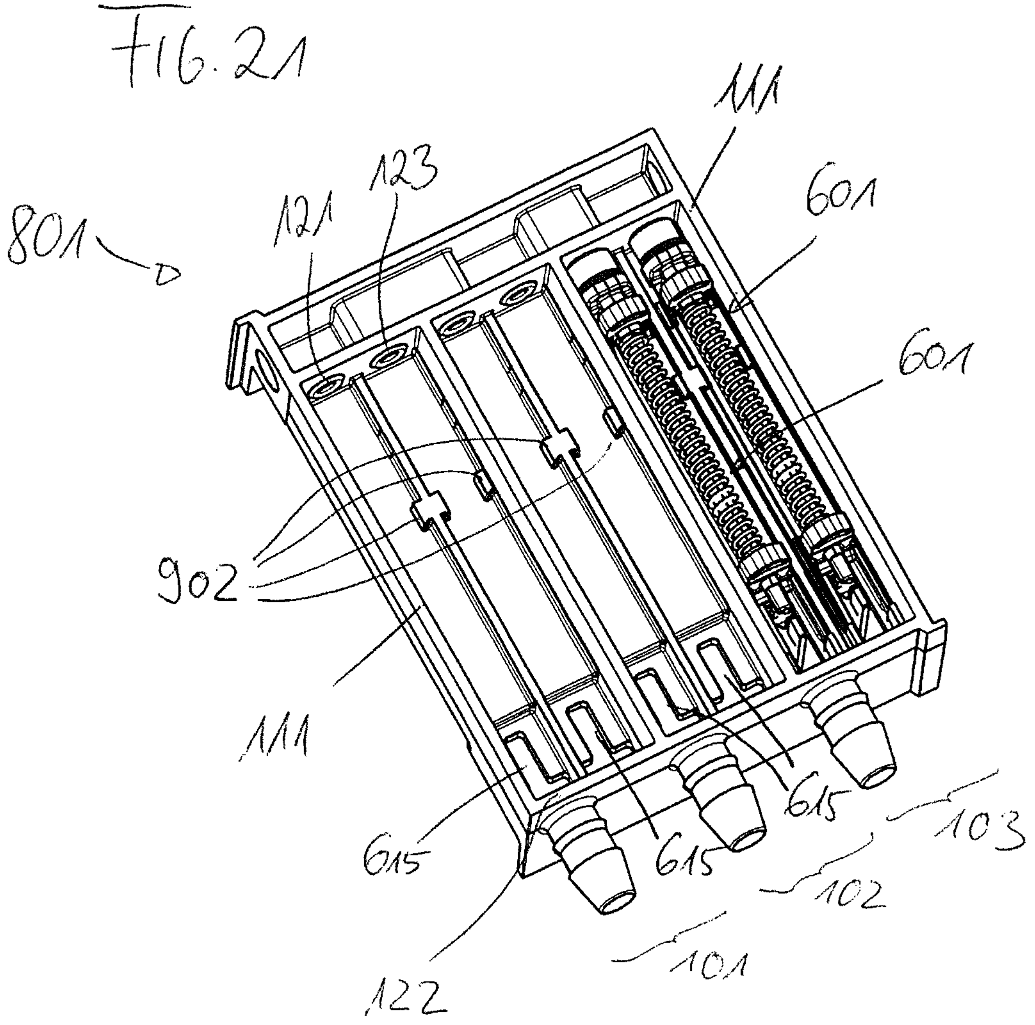
FIG. 21 is a perspective view of a valve block including multiple 3/3 valves, each valve including two actuator components according to the example implementation of FIG. 11 according to various examples.

FIG. 21 is a perspective view of a multi-channel valve block 801 including three valves 101-103. The valves 101-103 are 3/3-valves and are each formed by two respective actuator components 601. In the scenario FIG. 21 the modular concept is emphasized by illustrating a state during manufacture of the valve block 801 in which the actuator component 601 of the valve 103 are already attached to the housing 111; however, the actuator components 601 of the valves 101-102 are not yet attached to the housing 111.

Illustrated in FIG. 21 are also protrusions 902 provided in the side parts 612 of the housing 111 that can provide a press fit with respective mating indentations 901 (cf. FIG. 11; FIG. 15) provided in the carrier 621.

Figure 22:
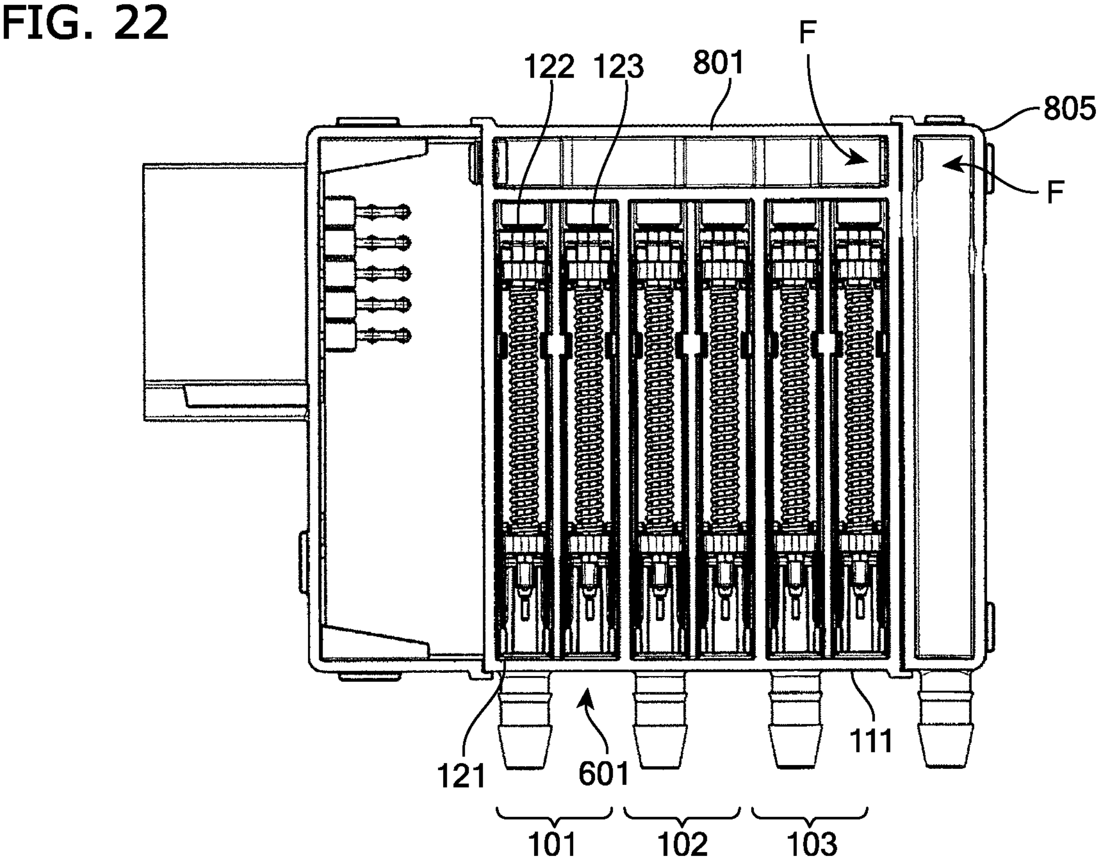
FIG. 22 is a top view of the valve block of FIG. 21, wherein the valve block is connected to a pump line block according to various examples.

FIG. 22 is a top view of the valve block 801 attached to a pump line block 805, i.e., a respective system 800 is illustrated. In FIG. 22, all actuator components 601 are attached to the housing 111.

While the system 800 includes the valve block 801 and the pump line block 805, alternatively or additionally to the pump line block 805 the system could include one or more further multi-channel valve blocks (cf. FIG. 10).

Figure 23:
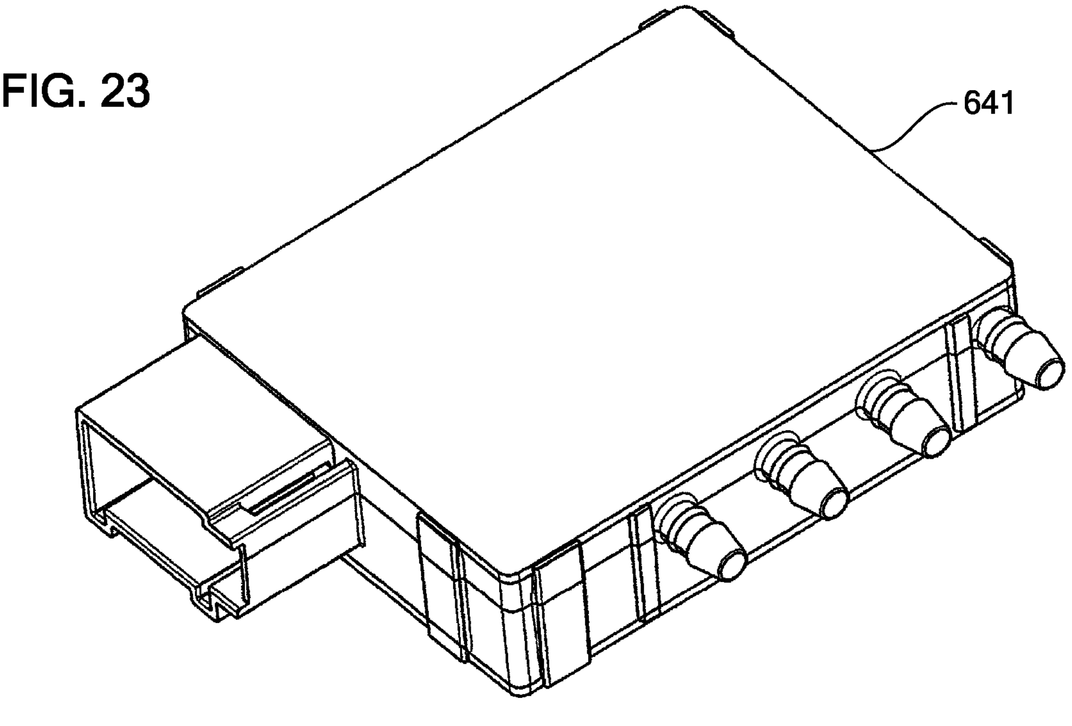
FIG. 23 is a perspective view of the system formed by the valve block and the pump line block of FIG. 22, wherein the top plate is attached according to various examples.

FIG. 23 is a respective perspective top view corresponding to the top view of the valve block 801, upon attaching the top plate 641.

FIG. 24 is the corresponding perspective bottom view, wherein the pins 721 of the actuator components 601 (cf. FIG. 11) protrude from underneath the circuit board 631.

The pins 721 extend through through holes 615 in the bottom plate 611 of the housing 111 (cf. FIG. 21; FIG. 6).

Figure 25:
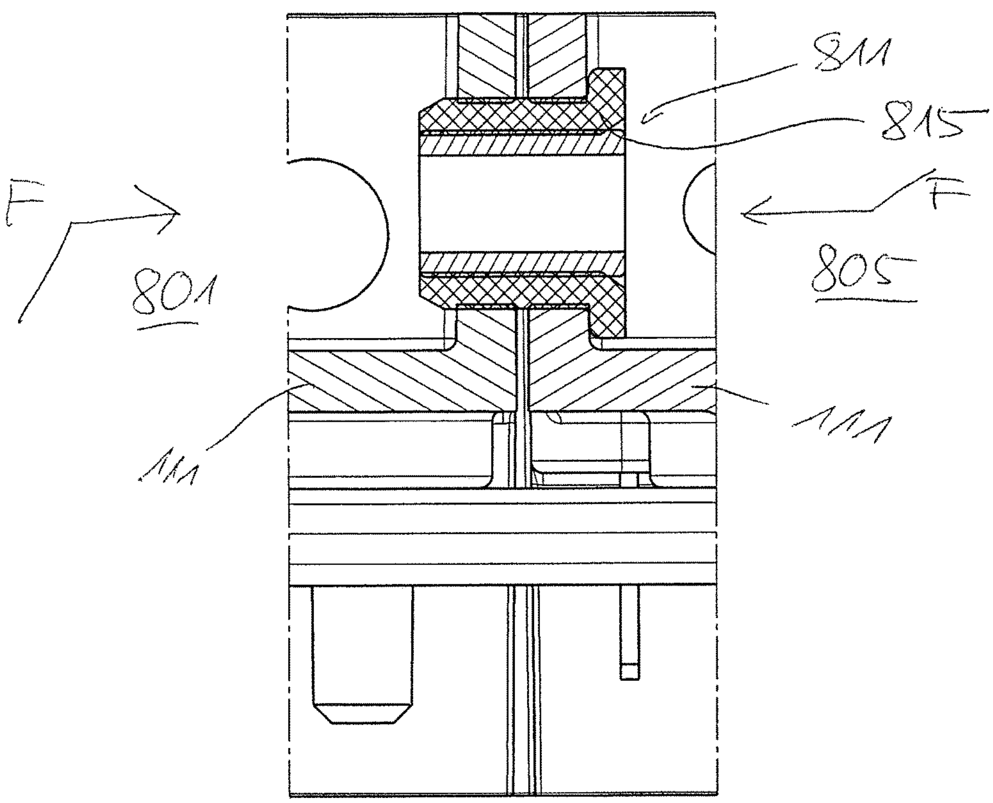
FIG. 25 is a cross-sectional view of a connection component between multiple blocks according to various examples.

FIG. 25 is a cross-sectional view along the line F-F denoted in FIG. 22. FIG. 25 illustrates aspects with respect to a connection component 811 used to establish a fluid flow path sealed against the environment between the valve block 801 and the pump line block 805. The connection component 811 includes an elastic element 815 that is inserted into a respective cannula extending from within the housing 111 of the valve block 801 to within the housing 111 of the pump line block 805. The elastic element 815 provides twofold functionality: firstly, it seals the fluid flow path against the environment; secondly, due to its elasticity, it allows for relative positioning of the valve block 801 with respect to the pump line block 805. This is, in particular, helpful for scenarios in which, e.g., multiple valve blocks are connected via respective connection component 811, wherein each valve block includes pins 721 to contact a common circuit board 631 shared between the multiple valve blocks.

As a general rule, the connection component 811 can be plug-shaped. The adjacent housings 111, more specifically the side parts 612 of the housings 111 can have through holes into which the plug-shaped connection component 811 can be pushed. The connection component 811 could include a sleeve-shaped piece, e.g., made of metal. The elastic element 815 can surround the metal sleeve or be arranged inside the metal sleeve. The metal sleeve can provide for additional sealing against the environment.

Figure 26:
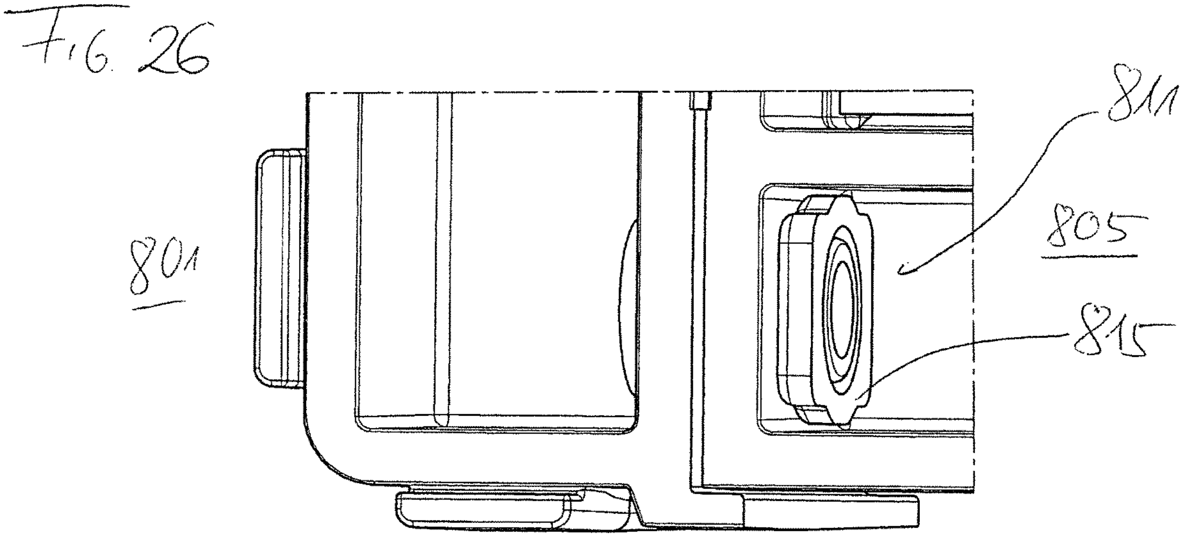
FIG. 26 is a perspective view of the connection component of FIG. 25 according to various examples.

FIG. 26 is a perspective view of the connection component 811, illustrating the inserted elastic element 815.

Next, a concrete implementation of a system 800 including multiple valve blocks 801-803 is discussed in connection with FIG. 27 and FIG. 28.

Figure 27:
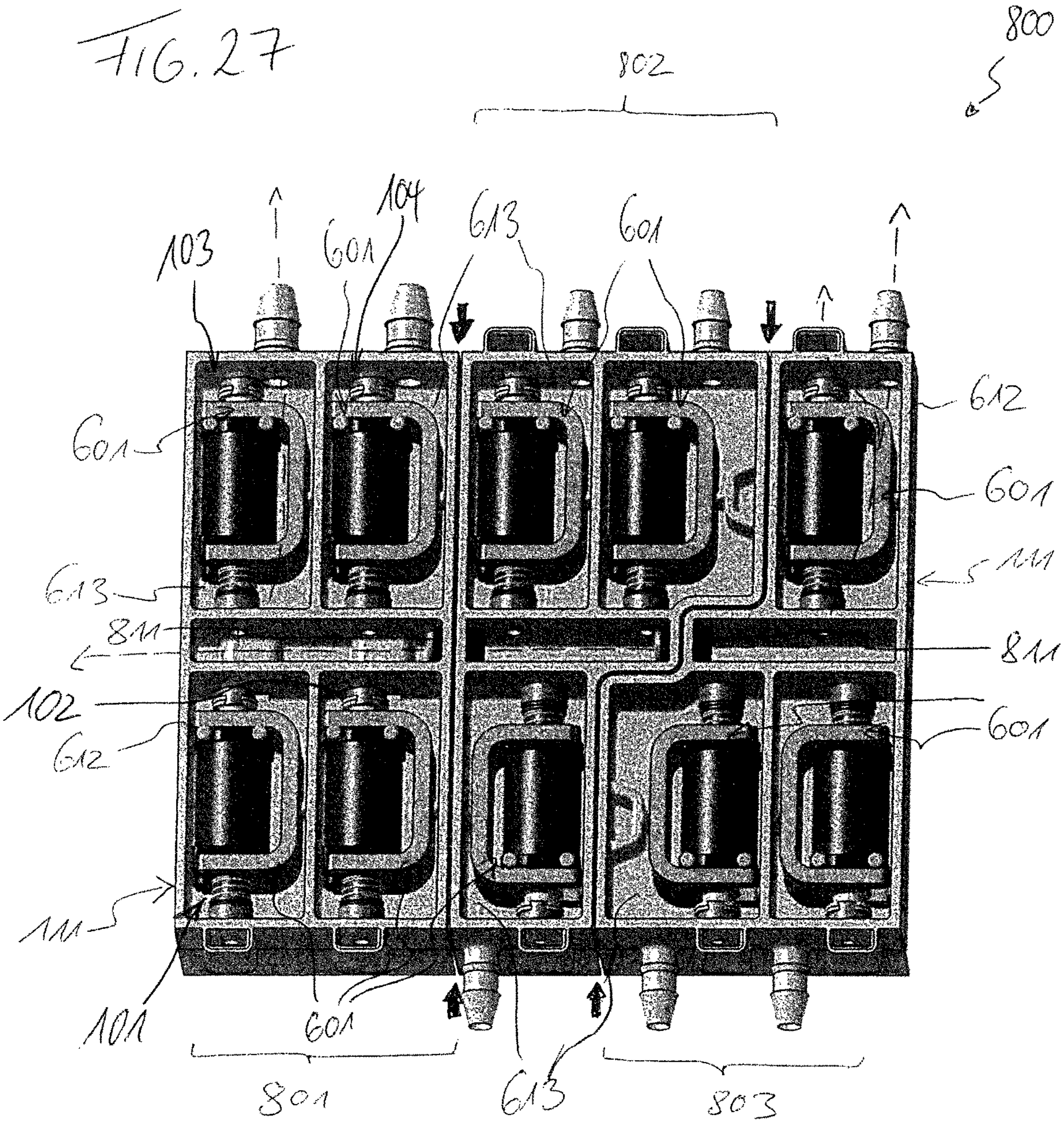
FIG. 27 is a top view of a system including multiple valve blocks according to various examples.

FIG. 27 is a top view of a system 800 including valve blocks 801-803. FIG. 28 is a respective exploded perspective view. Each valve block includes a number of valves, e.g., the valve block 801 includes four valves 101-104 (the three valves of the valve block 802 are not labeled and the three valves of the valve block 803 are also not labeled, for sake of simplicity).

Figure 28:
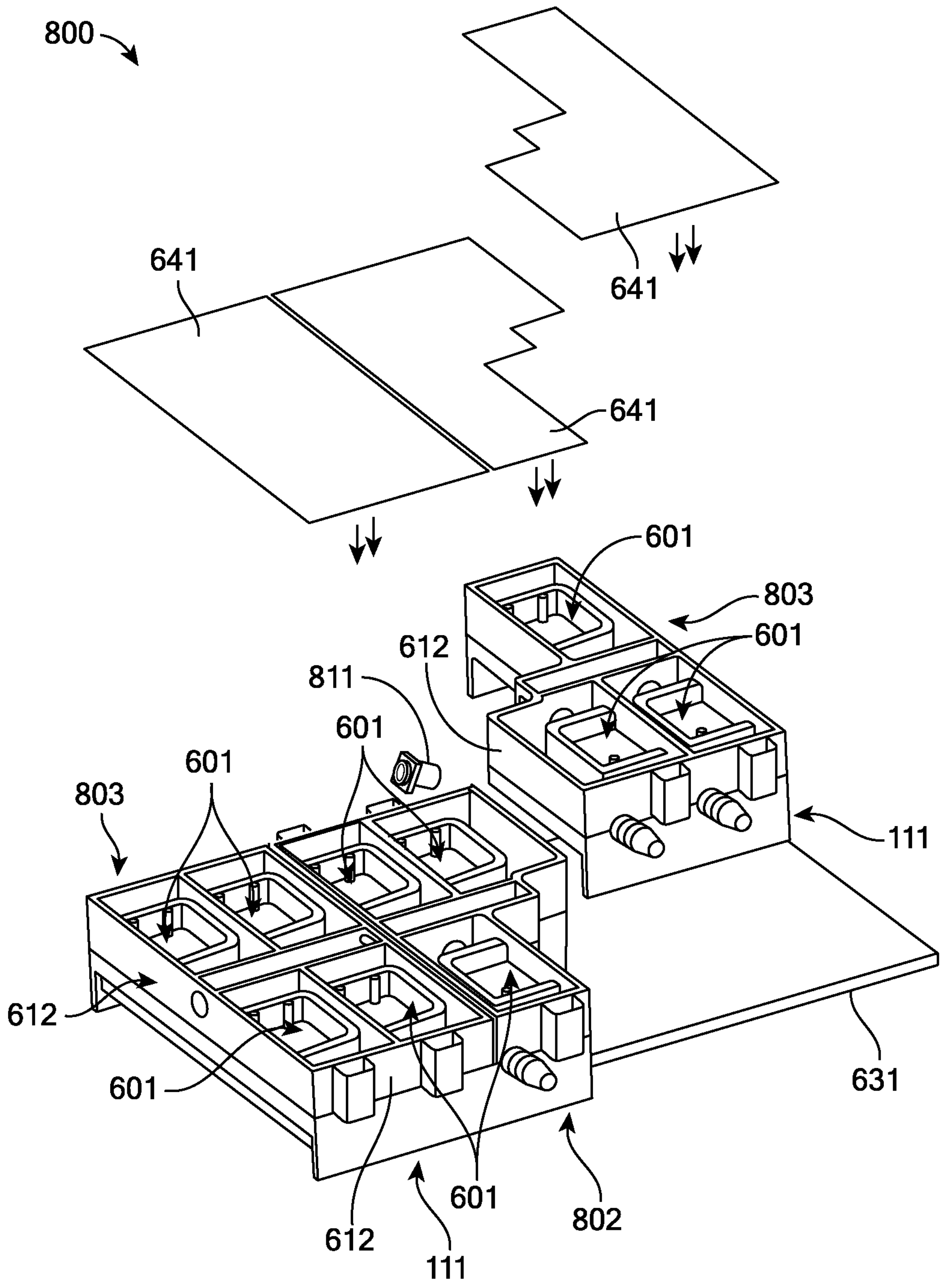
FIG. 28 is a perspective view of the system of FIG. 27.

In the scenario FIG. 27 and FIG. 28, each valve block 801-803 has its own housing (the full arrows mark the borders between the housings 111). The housings 111 of the valve blocks 801-803 are fluidly coupled via respective connection elements 811. The fluid flow path is thus established in between the valve blocks 801-803 (some branches of the fluid flow path are illustrated using dashed lines in FIG. 27).

The connection components 811 are plug-shaped. The connection elements 811 include elastic components 811 that are configured to provide a positional degree of freedom for relative displacement of the respective valve blocks 801-803 with respect to each other. For example, the connection element 811 arranged to fluidly couple an interior of the housing 111 of the valve block 801 with an interior of the housing 111 of the valve block 802 includes a respective elastic element that allows to space apart or move together the housings 111 of the valve blocks 801, 802, i.e., increase or decrease a respective gap in-between the housings 111. Also a relative rotation of the housings 111 of the valve blocks 801-802 can be accommodated for by the elastic element. This freedom in the positioning of the valve blocks 801-803 with respect to each other enables electrical connection of each electrical actuator of the respective actuator components 601 (implemented by solenoid actuators in the example of FIG. 27; however, other kinds and types of electrical actuators could be used, e.g., actuators employing an SMA wire 151 as discussed above, e.g., in connection with FIG. 1 to FIG. 5; also, in FIG. 27 and FIG. 28 the actuator components 601 are shown in a state in which they are already attached to the housings 111 of the valve blocks 801-803) with a circuit board 631. Here, pins of the valves can be coupled to the circuit board 631, more specifically to size-constrained electrical contact regions of the circuit board 631. As illustrated in FIG. 28, the bottom plate of the housing 111 is arranged in-between the actuator components 601 including the electrical actuator (here: the solenoids), and the circuit board 631. Accordingly, the pins can extend through through holes formed in the bottom plate of the housing 111 (cf. FIG. 6).

Figure 29:
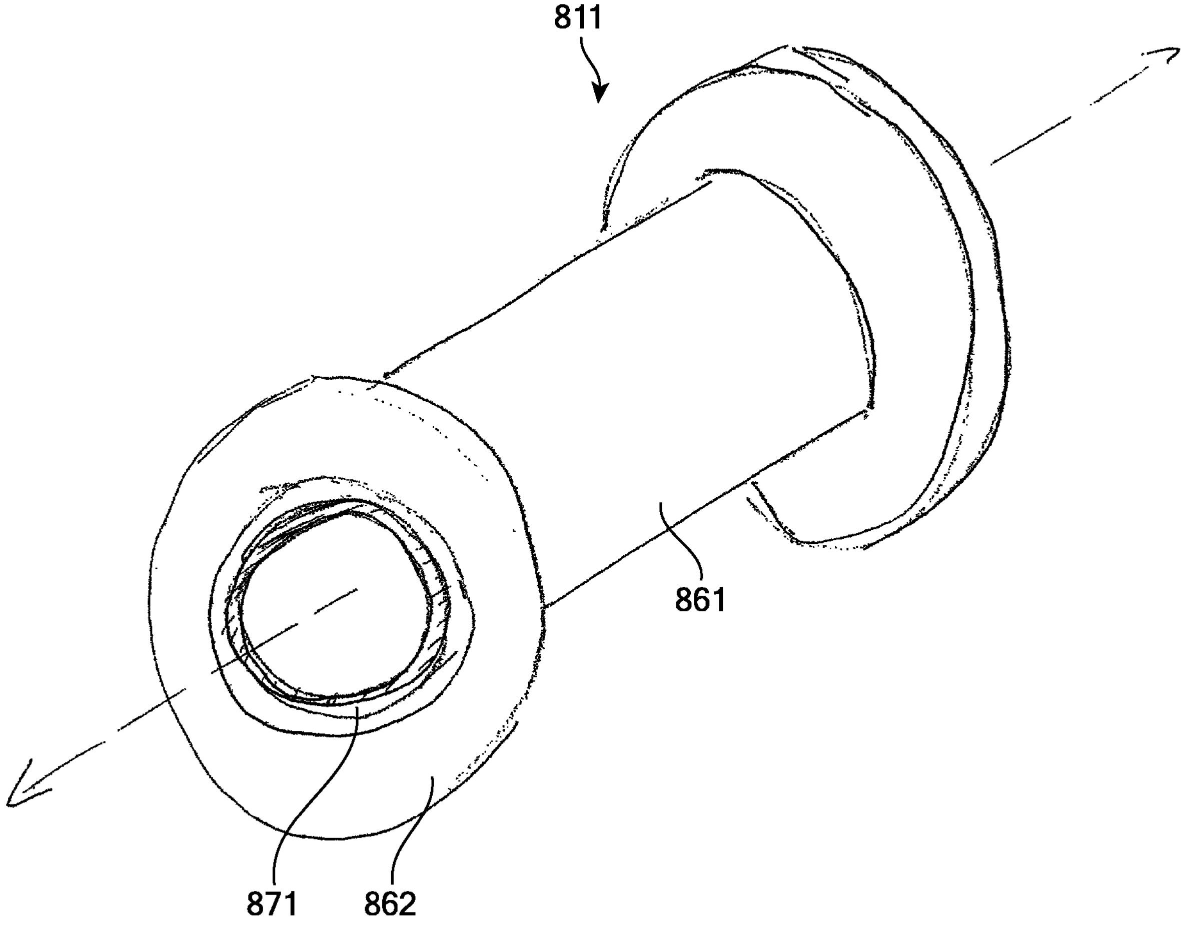
FIG. 29 is a perspective view an example implementation of a connection element configured to establish a fluid flow path between the interiors of the housings of adjacent valve blocks and providing a positional degree of freedom.

Further, as illustrated in FIG. 28, it is possible that each valve block 801-803 has its own top plate 641 that sealingly engages the upper ends of the side parts 612 of the housings 111. In other examples, a single top plate 641 can be used. This can have benefits, e.g., in terms of manufacture of the top plate using laser cutting, structural robustness, etc., FIG. 29 is a perspective view of an example implementation of the connection component 811. The connection component 811 includes an elastic element 861, e.g., made from rubber. The elastic element 861 is cylindrically shaped, so as to extend between interiors of the housings 111 of adjacent valve blocks 801-803. The elastic element 861 has flanges 862 at the ends, e.g., to provide a better seal against the environment. Furthermore, there is an optional metallic sleeve-shaped cannula 871 inserted into the elastic element 861. This establishes the fluid flow path (dashed line).

Summarizing, above, techniques have been described which facilitate efficient switching of fluid flow paths. Valves relying on pre-assembled actuator components, multi-channel valve blocks, and systems including multiple valve blocks have been described. Thereby, various setups for switching one or more fluid flow paths can be flexibly configured using a modular set up.

A linear configuration of SMA-based actuator components that can be attached to a housing to thereby form a valve have been described. Thereby, compact and light-weight valves can be provided.

Summarizing, at least the following examples have been described:

EXAMPLE 1. An actuator component (601) configured to cooperate with a housing (111) to form a valve (100-106), the actuator component comprising:

a carrier (621) attachable to the housing (111), a plunger (125, 125-1, 125-2, 125-3) arranged on the carrier (621) and comprising a sealing surface (125-3) arranged at a top end of the plunger (125, 125-1, 125-2, 125-3), a shape memory alloy actuator (151, 152) arranged co-linearly with the plunger (125, 125-1, 125-2, 125-3) between the carrier (621) and the plunger (125, 125-1, 125-2, 125-3) and configured to exert an actuation force onto the plunger (125, 125-1, 125-2, 125-3), and a spring (161) co-linearly arranged with the plunger (125, 125-1, 125-2, 125-3) between the carrier (621) and the plunger (125, 125-1, 125-2, 125-3) and configured to exert a bias force onto the plunger (125, 125-1, 125-2, 125-3).

EXAMPLE 2. The actuator component (601) of EXAMPLE 1, wherein the plunger (125, 125-1, 125-2, 125-3) comprises a plunger body (125-2) and a plunger cap (125-1) attached to the plunger body (125-2), wherein the sealing surface (125-3) is formed by the plunger cap (125-2).

EXAMPLE 3. The actuator component (601) of EXAMPLE 2, wherein the shape memory alloy actuator (151, 152) is attached to the plunger (125, 125-1, 125-2, 125-3) in a recess (157-1) formed in-between the plunger body (125-2) and the plunger cap (125-1).

EXAMPLE 4. The actuator component (601) of any one of the preceding EXAMPLES, wherein the spring (161) is a compression spring (161) coiled about the plunger (125, 125-1, 125-2, 125-3).

EXAMPLE 5. The actuator component (601) of EXAMPLE 4, wherein the plunger (125, 125-1, 125-2, 125-3) comprises a radial protrusion (129) extending 360° in a circumferential direction of the plunger (125, 125-1, 125-2, 125-3), wherein the compression spring (161) abuts against an engagement surface formed by the radial protrusion of the plunger (125, 125-1, 125-2, 125-3).

EXAMPLE 6. The actuator component (601) of any one of the preceding EXAMPLES, further comprising:

at least one through hole (665) formed on top of the carrier (621), wherein the plunger (125, 125-1, 125-2, 125-3) is arranged in the at least one through hole (665).

EXAMPLE 7. The actuator component (601) of EXAMPLE 6, wherein the at least one through hole (665) and the plunger (125, 125-1, 125-2, 125-3) have a non-circular cross-section.

EXAMPLE 8. The actuator component (601) of any one of the preceding EXAMPLES, wherein the carrier (621) is of elongated shape having an upper surface (625) and a bottom surface (626), wherein the plunger (125, 125-1, 125-2, 125-3), the shape memory alloy actuator (151, 152), and the spring (161) extend along the upper surface (625).

EXAMPLE 9. The actuator component (601) of EXAMPLE 8, further comprising:

electrical contacts (701) configured to contact the shape memory alloy actuator (151, 152), and electrical pins (721) electrically connected to the electrical contacts (701) and extending away from the bottom surface (626) of the carrier (621).

EXAMPLE 10. The actuator component (601) of EXAMPLE 8 or 9, further comprising:

an elastic member (681) extending away from the upper surface (625) of the carrier (621) and configured to engage with a top plate (641) to press the carrier (621) against a bottom plate (611) of the housing (111).

EXAMPLE 11. A valve (100-106), comprising:

the actuator component (601) of any one of the preceding EXAMPLES, the housing (111) comprising a bottom plate (611) engaging the actuator component (601), the housing (111) further comprising a first fluid port (121) and a second fluid port (122), wherein the actuator component (601) is arranged such that the sealing surface (125-3) of the plunger (125, 125-1, 125-2, 125-3) can sealingly engage the first fluid port (121).

EXAMPLE 12. The valve (100-106) of EXAMPLE 11, wherein the actuator component (601) is arranged in-between the first fluid port (121) and the second fluid port (122) in a fluid flow path between the first fluid port (121) and the second fluid port (122).

EXAMPLE 13. The valve (100-106) of EXAMPLE 11 or 12, wherein the carrier (621) is press-fitted to the housing (111) using protrusions (902).

EXAMPLE 14. The valve (100-106) of any one of EXAMPLEs 11 to 13, further comprising:

a circuit board (631) comprising circuitry (701, 705) configured to provide an electrical current to actuate the shape memory alloy actuator (151, 152), wherein the housing (111) is at least partly arranged between the circuit board (631) and the carrier (621), wherein the housing (111) comprises through holes (615) configured to receive electrical pins of the actuator component (601) extending towards the circuit board (631).

EXAMPLE 15. A system (800), comprising:

a valve block (801-803) comprising multiple valves (100-106) according to any one of EXAMPLEs 11 to 14, at least one of a further valve block (801) or a pump line block (805) electrically connected to the circuit board (631) of the valve block (801-803), a connection component (811) attached to the housing (111) of the valve block (801-803) and to a housing (111) of the at least one of the further valve block (801-803) or the pump line block (805) and configured to establish a fluid flow path between the valve block (801-803) and the at least one of the further valve block (801-803) or the pump line block (805), wherein the connection component (811) comprises an elastic element (815) configured to provide a positional degree of freedom for relative displacement between the valve block (801-803) and the at least one of the further valve block (801-803) or the pump line block (805).

EXAMPLE 16. A method, comprising:

assembling (1001) one or more actuator components (601), each one of the one or more actuator components (601) comprising a carrier (621), a plunger (125, 125-1, 125-2, 125-3) arranged on the carrier (621), and an actuator (151, 152) arranged on the carrier (621), and after said assembling (1001), attaching (100-1062) the one or more actuator components (601) to a housing (111), the housing (111) comprising, for each one of the one or more actuator components (601) at least one respective fluid port (121-123).

EXAMPLE 17. The method of EXAMPLE 16, further comprising:

attaching (1002) the housing (111) to a circuit board (631), the circuit board (631) being arranged adjacent to a bottom surface of a bottom plate (611) the housing (111), the one or more actuator components (601) being arranged adjacent to a top surface of the bottom plate (611) of the housing (111).

EXAMPLE 18. The method of EXAMPLE 17, wherein a bottom plate of the housing (111) comprises one or more through holes (615), wherein pins (721) of the one or more actuator components (601) are arranged in the one or more through holes (615), wherein the method further comprises:

sealing the one or more through holes (615) using a sealant.

EXAMPLE 19. The method of EXAMPLE 17 or 18, further comprising:

attaching a further housing (111) to which one or more further actuator components (601) are attached to the circuit board (631), and forming (1005) a fluid flow path between the housing (111) and the further housing (111) using a connection component (811) comprising an elastic element (815).

EXAMPLE 20. The method of any one of EXAMPLEs 16 to 19, wherein each one of the one or more actuator components (601) comprises a respective elastic member extending away from a top surface of the carrier (621), wherein the method further comprises:

attaching (100-1064) a top plate (641), thereby pressing the one or more actuator components (601) against the housing (111) via the elastic member.

EXAMPLE 21. A system (800), comprising:

multiple valve blocks (801-803) attached to a circuit board (631), each valve block (801-803) comprising a respective housing (111) and one or more valves (101-106) in the respective housing (111), and one or more connection components (811) fluidly connecting interiors of the housings (111) of the multiple valve blocks (801-803), each one of the one or more connection components (811) comprising a respective elastic element configured to provide a positional degree of freedom for relative displacement of the respective two valve blocks with respect to each other.

EXAMPLE 22. The system of EXAMPLE 21, wherein each one of the one or more valves (101-106) comprises one or more electrical pins (721) coupled to the circuit board (631).

EXAMPLE 23. The system of EXAMPLE 22, wherein the one or more pins (721) extend through through holes (615) formed in a bottom plate (611) of the respective housing (111).

EXAMPLE 24. The system of any one of EXAMPLEs 21 to 23, further comprising:

a top plate (641) sealingly attached to side parts (612) of the housings (111) of the multiple valve blocks (801-803).

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described in connection with an implementation of the actuator component that relies on a co-linear arrangement of the plunger, the SMA wire, and the spring. In other examples, it would be possible to implement another arrangement of the plunger, the SMA wire, in the spring, e.g., a lever-type architecture. In particular, also other designs can benefit from the modularity provided by assembling the actuator component prior to attaching the actuator component to the housing. Similarly, also other designs can benefit from the modularity of being able to connect multiple valve blocks each valve block including one or more of us with each other via connection elements that provide for a positional degree of freedom of the valve blocks with respect to each other so that a single circuit board can be shared.

For further illustration, various examples have been described in connection with an implementation of the actuator component using an SMA wire as an actuator, to move the plunger between a closed position and an opened position. Various examples—in particular, in connection with the modular setup using a carrier that is attachable to the housing to form the valve and/or using multiple valve blocks that can be fluidly connected via a connection component—can be similarly implemented using other kinds and types of actuators, e.g., piezoelectric or solenoid actuators.

Still further illustration, various examples have been described in connection with an implementation of a modular setup in which an actuator and a plunger are assembled onto a carrier, thereby, forming an actuator component, and then the carrier can be attached to a housing. Scenarios are also conceivable in which the actuator component does not require a separate carrier unit. Here, it would be possible that the actuator itself can provide for a carrier functionality, i.e., mounting of the plunger and connection to the housing. This would be conceivable, e.g., for a piezoelectric actuator. Similarly, various examples have been described in connection with an implementation of the carrier as a plate. Other forms and implementations of the carrier would be conceivable, e.g., a rod-shaped carrier, etc.

What is claimed is:

1. A valve, comprising:

a housing comprising a bottom plate, a first fluid port and a second fluid port;

an actuator component arranged such that the bottom plate of the housing engages the actuator component, the actuator component comprising:

a carrier attachable to the housing;

a plunger arranged on the carrier and comprising a sealing surface arranged at a top end of the plunger;

a shape memory alloy actuator arranged co-linearly with the plunger between the carrier and the plunger and configured to exert an actuation force onto the plunger; and a spring co-linearly arranged with the plunger between the carrier and the plunger and configured to exert a bias force onto the plunger, wherein the actuator component is arranged such that the sealing surface of the plunger can sealingly engage the first fluid port, and wherein the actuator component is arranged in-between the first fluid port and the second fluid port of the housing in a fluid flow path between the first fluid port and the second fluid port; and a circuit board comprising circuitry configured to provide an electrical current to actuate the shape memory alloy actuator, wherein the housing is at least partly arranged between the circuit board and the carrier, and wherein the housing comprises through holes configured to receive electrical pins of the actuator component extending towards the circuit board.

2. The valve of claim 1, wherein the plunger comprises a plunger body and a plunger cap attached to the plunger body, wherein the sealing surface is formed by the plunger cap, and wherein the shape memory alloy actuator is attached to the plunger in a recess formed in-between the plunger body and the plunger cap.

3. The valve of claim 2, wherein the spring is a compression spring coiled about the plunger, wherein the plunger comprises a radial protrusion extending 360° in a circumferential direction of the plunger, and wherein the compression spring abuts against an engagement surface formed by the radial protrusion of the plunger.

4. The valve of claim 1, wherein the spring is a compression spring coiled about the plunger, wherein the plunger comprises a radial protrusion extending 360° in a circumferential direction of the plunger, and wherein the compression spring abuts against an engagement surface formed by the radial protrusion of the plunger.

5. The valve of claim 1, further comprising at least one through hole formed on top of the carrier, wherein the plunger is arranged in the at least one through hole.

6. The valve of claim 1, wherein the carrier is of elongated shape having an upper surface and a bottom surface, and wherein the plunger, the shape memory alloy actuator, and the spring extend along the upper surface.

7. The valve of claim 6, further comprising:

electrical contacts configured to contact the shape memory alloy actuator; and electrical pins electrically connected to the electrical contacts and extending away from the bottom surface of the carrier.

8. The valve of claim 6, further comprising an elastic member extending away from the upper surface of the carrier and configured to engage with a top plate to press the carrier against a bottom plate of the housing.

9. A system, comprising:

a first valve block including the valve of claim 1;

a second valve block electrically connected to the circuit board of the first valve block; and a connection component attached to a housing of the first valve block and to a housing of the second valve block and configured to establish a fluid flow path between the first valve block and the second valve block, wherein the connection component comprises an elastic element configured to provide a positional degree of freedom for relative displacement between the first valve block and the second valve block.

10. The system of claim 9, wherein each one of the first and second valve blocks comprises an electrical pin coupled to the circuit board, wherein the electrical pin of the first valve block extends through a through hole formed in a bottom plate of the housing of the first valve block, and wherein the electrical pin of the second valve block extends through a through hole formed in a bottom plate of the housing of the second valve block.

11. The system of claim 10, further comprising a top plate sealingly attached to side parts of the housings of the first and second valve blocks.

12. The system of claim 9, further comprising a top plate sealingly attached to side parts of the housings of the first and second valve blocks.

13. A system, comprising:

a valve block including the valve of claim 1;

a pump line block electrically connected to the circuit board of the valve block; and a connection component attached to a housing of the valve block and to a housing of the pump line block and configured to establish a fluid flow path between the valve block and the pump line block, wherein the connection component comprises an elastic element configured to provide a positional degree of freedom for relative displacement between the valve block and the pump line block.

14. A valve block comprising:

a housing including a plurality of fluid ports;

a plurality of valves disposed within the housing, each valve of the plurality of valves including an actuator component comprising a carrier coupled to the housing, a plunger arranged on the carrier and including a plunger cap defining a sealing surface configured to sealingly engage a corresponding fluid port of the plurality of fluid ports, a shape memory alloy actuator coupled to the carrier and configured to exert an actuation force onto the plunger; and a spring co-linearly arranged with the plunger between the carrier and the plunger and configured to exert a bias force onto the plunger; and a circuit board comprising circuitry electrically connected to the actuator component of each valve of the plurality of valves such that the circuitry is configured to provide an electrical current to actuate the shape memory alloy actuator, wherein the housing is at least partly arranged between the circuit board and the carrier of the actuator component of each valve of the plurality of valves.

15. The valve block of claim 14, wherein the actuator component includes electrical pins extending through the housing to the circuit board.

16. The valve block of claim 14, wherein the shape memory alloy actuator is a wire arranged in a U-shape.

17. The valve block of claim 15, wherein the actuator component further comprises electrical contacts configured to contact the shape memory alloy actuator, and wherein the electrical pins are electrically connected to the electrical contacts and extend away from a bottom surface of the carrier.

18. The valve block of claim 17, wherein the housing includes a top plate and a bottom plate, and wherein the actuator component of each valve of the plurality of valves is arranged such that the bottom plate of the housing engages the actuator component.

19. The valve block of claim 18, wherein the electrical pins extend through through through holes formed in the bottom plate.

20. The valve block of claim 14, further comprising a connection component attached to the housing and including an elastic element, wherein the connection component is configured to establish a fluid flow path between the valve block and a further valve block or a pump line block.

* * * * *